(12) United States Patent
Hung

(10) Patent No.: US 11,863,075 B2
(45) Date of Patent: Jan. 2, 2024

(54) MULTI-PHASE BOOST CONVERTING APPARATUS WITH PASSIVE LOSSLESS SNUBBER

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 96 days.

(21) Appl. No.: 17/573,124

(22) Filed: Jan. 11, 2022

(65) Prior Publication Data

US 2023/0109823 A1  Apr. 13, 2023

(30) Foreign Application Priority Data

Oct. 8, 2021 (TW) .................................. 110137613

(51) Int. Cl.
*H02M 3/158* (2006.01)
*H02M 1/34* (2007.01)
*H02M 1/00* (2006.01)

(52) U.S. Cl.
CPC ....... *H02M 3/1586* (2021.05); *H02M 1/0058* (2021.05); *H02M 1/346* (2021.05)

(58) Field of Classification Search
CPC .... H02M 1/0043; H02M 1/0058; H02M 1/34; H02M 1/346; H02M 1/4225; H02M 3/01; H02M 3/1584; H02M 3/1586
See application file for complete search history.

(56) References Cited

U.S. PATENT DOCUMENTS

| | | | | |
|---|---|---|---|---|
| 11,245,333 | B2* | 2/2022 | Kawamura | H02M 1/14 |
| 2012/0068678 | A1* | 3/2012 | Hatae | H02M 1/34 |
| | | | | 323/272 |
| 2015/0002128 | A1* | 1/2015 | Cho | H02M 1/34 |
| | | | | 323/272 |
| 2015/0171775 | A1* | 6/2015 | Cho | F24F 1/0007 |
| | | | | 318/504 |
| 2016/0226372 | A1* | 8/2016 | Willenberg | H02M 1/34 |
| 2016/0268895 | A1* | 9/2016 | Sadohara | H02M 1/34 |
| 2022/0158553 | A1* | 5/2022 | Sadohara | H02M 3/156 |

OTHER PUBLICATIONS

Tseng et al., "A Novel Turn-On/Off Snubber for Interleaved Boost Converters," 2007 IEEE Power Electronics Specialists Conference, Orlando, FL, USA, 2007, pp. 2341-2347, doi: 10.1109/PESC.2007. 4342376. (Year: 2007).*
Gallo et al., "A Passive Lossless Snubber Applied to the AC-DC Interleaved Boost Converter," in IEEE Transactions on Power Electronics, vol. 25, No. 3, pp. 775-785, Mar. 2010, doi: 10.1109/ TPEL.2009.2033063. (Year: 2010).*

* cited by examiner

*Primary Examiner* — Fred E Finch, III
(74) *Attorney, Agent, or Firm* — Muncy, Geissler, Olds & Lowe, P.C.

(57) ABSTRACT

A multi-phase boost converting apparatus includes a multi-phase boost converter and a passive lossless snubber, wherein the passive lossless snubber includes a first resonant capacitor, a second resonant capacitor, an output-end first unidirectional conduction component, an output-end second unidirectional conduction component, an input-end first unidirectional conduction component, an input-end second unidirectional conduction component and a resonant inductor.

5 Claims, 21 Drawing Sheets

MULTI-PHASE BOOST CONVERTING APPARATUS WITH PASSIVE LOSSLESS SNUBBER

BACKGROUND OF THE DISCLOSURE

Technical Field

The present disclosure relates to a multi-phase boost converting apparatus with a snubber, and especially relates to a multi-phase boost converting apparatus with a passive lossless snubber.

Description of Related Art

The related art bi-phase hard-switching boost converter will produce a significant overlap area of the voltage and current on the voltage and current waveforms when switching, and this overlap area of the voltage and current is the switching loss of the switch, wherein this switching loss will reduce the energy conversion efficiency and increase the temperature of the components.

Afterwards, the related art bi-phase soft-switching boost converter is provided, so that the overlap area of the voltage and current on the voltage and current waveforms mentioned above can be reduced, thereby reducing the energy loss. The related art bi-phase soft-switching boost converter reduces the switching loss by reducing the rising slope or the falling slope of the switch voltage or the switch current.

However, some related art bi-phase soft-switching boost converters have higher conduction loss and can only operate when the duty cycle is less than 50%, while some related art bi-phase soft-switching boost converters cannot enable the phase interleaved 180 degrees when the duty cycle is less than 50%; furthermore, some related art bi-phase soft-switching boost converters have too many switching components.

SUMMARY OF THE DISCLOSURE

In order to solve the above-mentioned problems, an object of the present disclosure is to provide a multi-phase boost converting apparatus with a passive lossless snubber.

In order to achieve the object of the present disclosure mentioned above, the multi-phase boost converting apparatus includes a multi-phase boost converter and a passive lossless snubber electrically connected to the multi-phase boost converter, wherein the passive lossless snubber includes a first resonant capacitor electrically connected to the multi-phase boost converter, a second resonant capacitor electrically connected to the multi-phase boost converter, an output-end first unidirectional conduction component electrically connected to the multi-phase boost converter and the first resonant capacitor, an output-end second unidirectional conduction component electrically connected to the multi-phase boost converter and the second resonant capacitor, an input-end first unidirectional conduction component electrically connected to the first resonant capacitor and the output-end first unidirectional conduction component, an input-end second unidirectional conduction component electrically connected to the second resonant capacitor and the output-end second unidirectional conduction component, and a resonant inductor electrically connected to the multi-phase boost converter, the input-end first unidirectional conduction component and the input-end second unidirectional conduction component.

The advantage of the present disclosure is to use a snubber with a simple structure to reduce the switching loss of the multi-phase boost converter and to reduce the electromagnetic interference.

BRIEF DESCRIPTION OF THE DRAWINGS

FIG. 2-1 to FIG. 2-8 respectively show the multi-phase boost converting apparatus in the full-type first working state to the full-type eighth working state of the present disclosure.

FIG. 3 shows a block diagram of the multi-phase boost converting apparatus of the present disclosure.

DETAILED DESCRIPTION OF THE EMBODIMENTS

Figure 1:
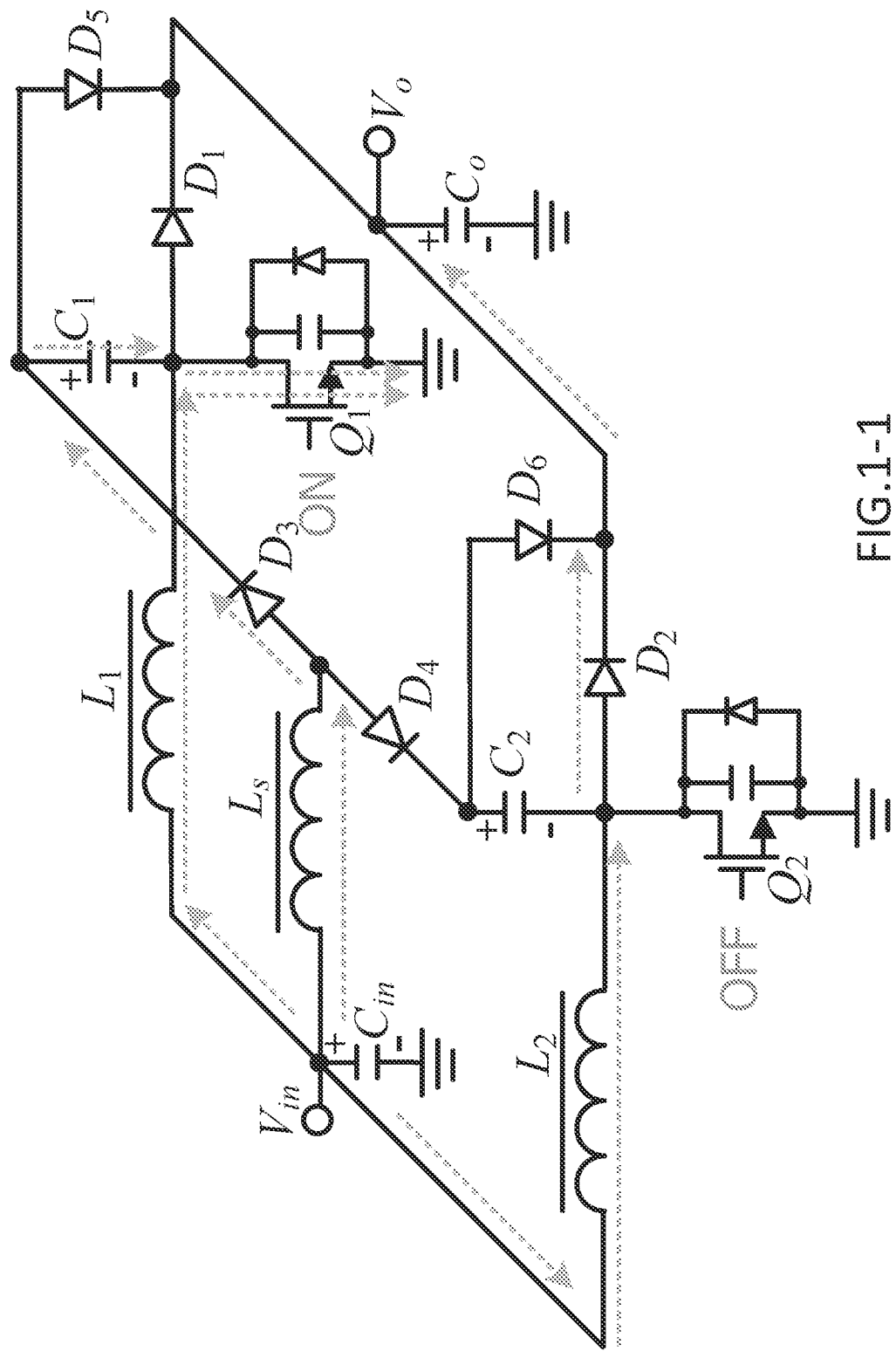
FIG. 1-1 to FIG. 1-8 respectively show the multi-phase boost converting apparatus in the half-type first working state to the half-type eighth working state of the present disclosure.
Figures 1, 2:
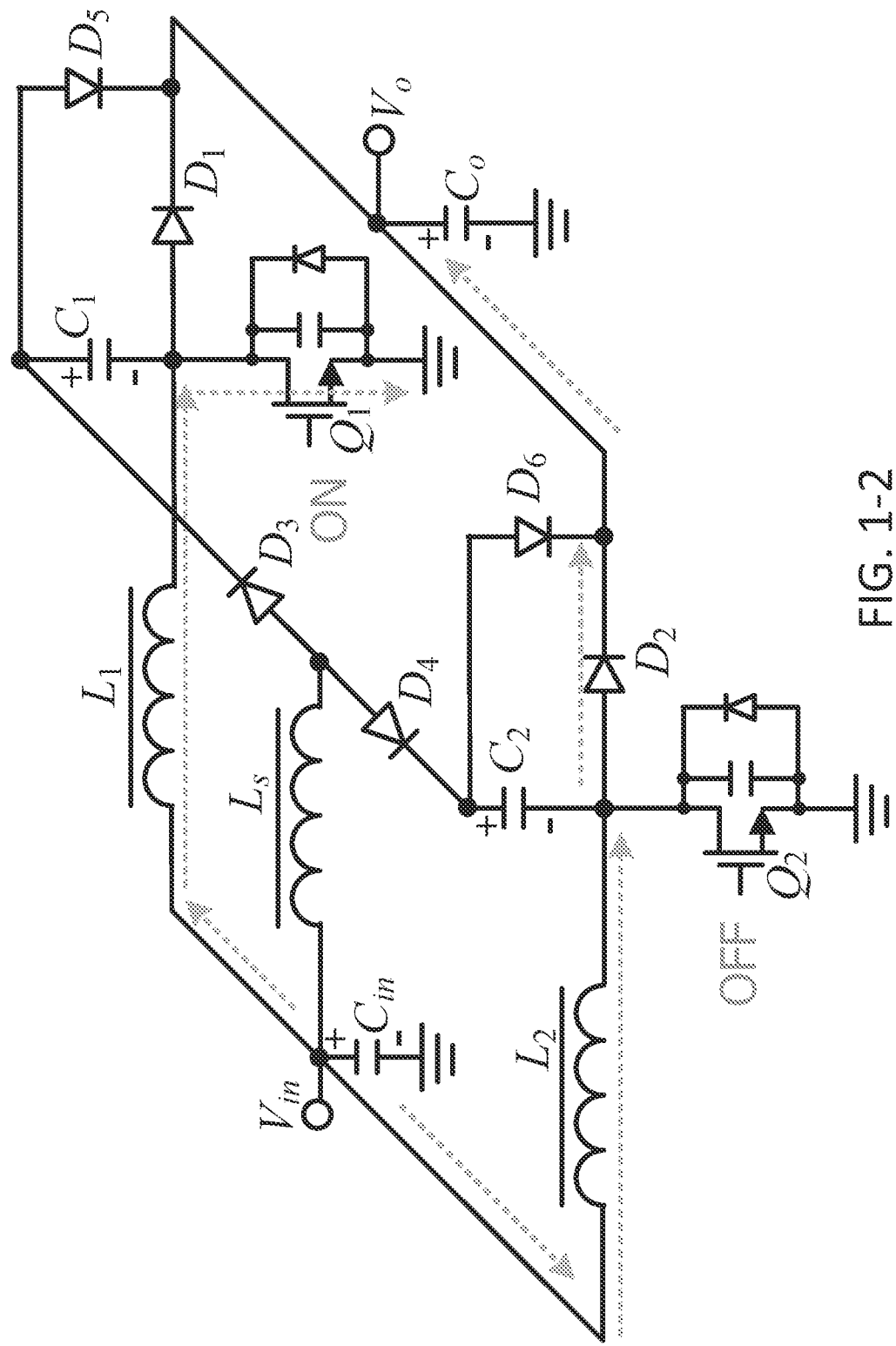
Figures 1, 2, 3:
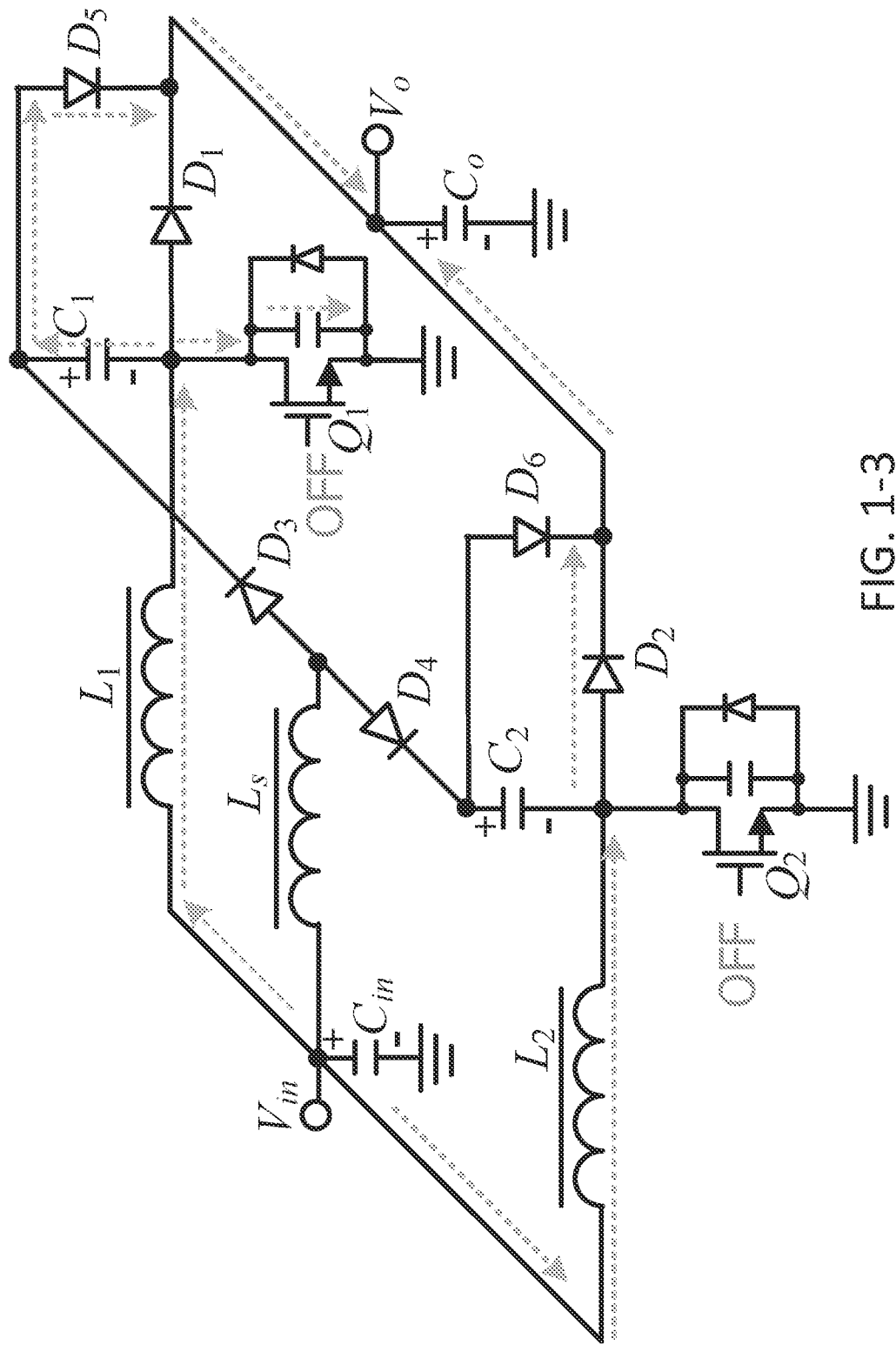

FIG. 3 shows a block diagram of the multi-phase boost converting apparatus of the present disclosure. A multi-phase boost converting apparatus 10 of the present disclosure includes a multi-phase boost converter 102 and a passive lossless snubber 104, wherein the passive lossless snubber 104 includes a first resonant capacitor $C_1$, a second resonant capacitor $C_2$, an input-end first unidirectional conduction component $D_3$, an input-end second unidirectional conduction component $D_4$, an output-end first unidirectional conduction component $D_5$, an output-end second unidirectional conduction component $D_6$ and a resonant inductor $L_s$. The multi-phase boost converter 102 includes a first inductor $L_1$, a second inductor $L_2$, a first transistor switch $Q_1$, a second transistor switch $Q_2$, a first diode $D_1$, a second diode $D_2$, a switch controller 106, an output end 108, an input end 110, an input-end capacitor $C_{in}$ and an output-end capacitor $C_o$, while the first transistor switch $Q_1$ has a first parasitic capacitor $C_{oss1}$ and the second transistor switch $Q_2$ has a second parasitic capacitor $C_{oss2}$, wherein the components mentioned above are electrically connected to each other.

For the ease of the explanations, the present disclosure assumes that the above-mentioned components are ideal, and the forward bias voltage of the diodes is all zero volts. The input-end first unidirectional conduction component $D_3$, the input-end second unidirectional conduction component $D_4$, the output-end first unidirectional conduction component $D_5$ and the output-end second unidirectional conduction component $D_6$ are, for example but not limited to, diodes; the first transistor switch $Q_1$ and the second transistor switch $Q_2$ are, for example but not limited to, metal oxide semiconductor field effect transistors; the switch controller 106 is, for example but not limited to, a pulse width modulation signal controller.

According to different load power requirements, the operation types of the multi-phase boost converting apparatus 10 of the present disclosure can be divided into a half-type operation and a full-type operation, wherein the half-type operation includes eight working states (namely, the half-type first working state to the half-type eighth working state) while the full-type operation also includes eight working states (namely, the full-type first working state to the full-type eighth working state).

First, the half-type operation of the present disclosure is described in detail as follows:

Please refer to FIG. 3 again; when the switch controller 106 is configured to transmit a pulse width modulation signal 112 to the first transistor switch $Q_1$ to drive the first transistor switch $Q_1$ and a duty cycle of the pulse width modulation signal 112 is less than 50%, or when the switch controller 106 is configured to transmit the pulse width modulation signal 112 to the second transistor switch $Q_2$ to drive the second transistor switch $Q_2$ and the duty cycle of the pulse width modulation signal 112 is less than 50%, the multi-phase boost converting apparatus 10 is configured to sequentially operate in a half-type first working state, a half-type second working state, a half-type third working state, a half-type fourth working state, a half-type fifth working state, a half-type sixth working state, a half-type seventh working state and a half-type eighth working state.

FIG. 1-1 to FIG. 1-8 respectively show the multi-phase boost converting apparatus in the half-type first working state to the half-type eighth working state of the present disclosure, wherein the dashed arrows are the directions of the currents, and for the sake of brevity, some components and symbols which are shown in FIG. 3 are omitted in FIG. 1-1 to FIG. 1-8, while the symbol ON next to the transistor switches means that the transistor switch is turned on, and the symbol OFF means that the transistor switch is turned off.

Please refer to FIG. 1-1 and FIG. 3 at the same time; when the multi-phase boost converting apparatus 10 is configured to operate in the half-type first working state, the switch controller 106 is configured to turn on the first transistor switch $Q_1$ and keep turning off the second transistor switch $Q_2$, and the first inductor $L_1$ is configured to be excited by an input-end voltage $V_{in}$ of the input end 110 to store a first electric energy in a first magnetic field form, and a first inductor current $i_{L1}$ flowing through the first inductor $L_1$ increases gradually, and the resonant inductor $L_s$ and the first resonant capacitor $C_1$ are configured to be charged by the input-end voltage $V_{in}$ and to resonate, and the input-end first unidirectional conduction component $D_3$ is configured to enable the resonant inductor $L_s$ and the first resonant capacitor $C_1$ to be configured to resonate for a half cycle and then stop resonating, so that a first resonant capacitor voltage $v_{C1}$ of the first resonant capacitor $C_1$ is twice the input-end voltage $V_{in}$, and so that a resonant inductor current $i_{Ls}$ flowing through the resonant inductor $L_s$ is zero, and then the multi-phase boost converting apparatus 10 is configured to operate in the half-type second working state.

Please refer to FIG. 1-2 and FIG. 3 at the same time; when the multi-phase boost converting apparatus 10 is configured to operate in the half-type second working state, the switch controller 106 is configured to keep turning on the first transistor switch $Q_1$ and keep turning off the second transistor switch $Q_2$, and the first inductor $L_1$ is configured to continue to be excited by the input-end voltage $V_{in}$, and the first inductor current $i_{L1}$ continues to increase, and then the multi-phase boost converting apparatus 10 is configured to operate in the half-type third working state.

Please refer to FIG. 1-3 and FIG. 3 at the same time; when the multi-phase boost converting apparatus 10 is configured to operate in the half-type third working state, the switch controller 106 is configured to turn off the first transistor switch $Q_1$ and keep turning off the second transistor switch $Q_2$, and the first parasitic capacitor $C_{oss1}$ is configured to be charged by the first inductor current $i_{L1}$ from zero volts, so that a first drain-source voltage $v_{ds1}$ of the first transistor switch $Q_1$ increases gradually, and the first resonant capacitor $C_1$ is configured to discharge, so that the output-end first unidirectional conduction component $D_5$ is configured to be forward-biased conducted, and the first resonant capacitor voltage $v_{C1}$ is discharged from twice the input-end voltage $V_{in}$ to zero volts, and the first drain-source voltage $V_{ds1}$ plus the first resonant capacitor voltage $v_{C1}$ is equal to an output-end voltage $V_o$ of the output end 108, and when the first resonant capacitor voltage $v_{C1}$ is discharged to zero volts, the first diode $D_1$ is configured to be forward-biased conducted, and then the multi-phase boost converting apparatus 10 is configured to operate in the half-type fourth working state.

Please refer to FIG. 1-4 and FIG. 3 at the same time; when the multi-phase boost converting apparatus 10 is configured to operate in the half-type fourth working state, the switch controller 106 is configured to keep turning off the first transistor switch $Q_1$ and keep turning off the second transistor switch $Q_2$, and the first diode $D_1$ is configured to continue to be forward-biased conducted by the first inductor current $i_{L1}$, and the resonant inductor current $i_{Ls}$ is zero, and an input-end first unidirectional conduction current $i_{D3}$ flowing through the input-end first unidirectional conduction component $D_3$ is zero, and an input-end second unidirectional conduction current $i_{D4}$ flowing through the input-end second unidirectional conduction component $D_4$ is zero, and a first resonant capacitor current $i_{C1}$ flowing through the first resonant capacitor $C_1$ is zero, and a second resonant capacitor current $i_{C2}$ flowing through the second resonant capacitor $C_2$ is zero, and an output-end first unidirectional conduction current $i_{D5}$ flowing through the output-end first unidirectional conduction component $D_5$ is zero, and an output-end second unidirectional conduction current $i_{D6}$ flowing through the output-end second unidirectional conduction component $D_6$ is zero (namely, no current flows through the components of the passive lossless snubber 104), and the first electric energy stored in the first magnetic field form by the first inductor $L_1$ is transmitted to the output end 108 in a current form, and the first inductor current $i_{L1}$ decreases gradually, and then the multi-phase boost converting apparatus 10 is configured to operate in the half-type fifth working state.

Please refer to FIG. 1-5 and FIG. 3 at the same time; when the multi-phase boost converting apparatus 10 is configured to operate in the half-type fifth working state, the switch controller 106 is configured to turn on the second transistor switch $Q_2$ and keep turning off the first transistor switch $Q_1$, and the second inductor $L_2$ is configured to be excited by the input-end voltage $V_{in}$ to store a second electric energy in a second magnetic field form, and a second inductor current $i_{L2}$ flowing through the second inductor $L_2$ increases gradually, and the resonant inductor $L_s$ and the second resonant capacitor $C_2$ are configured to be charged by the input-end voltage $V_{in}$ and to resonate, and the input-end second unidirectional conduction component $D_4$ is configured to enable the resonant inductor $L_s$ and the second resonant capacitor $C_2$ to be configured to resonate for the half cycle and then stop resonating, so that a second resonant capacitor voltage $v_{C2}$ of the second resonant capacitor $C_2$ is twice the input-end voltage $V_{in}$, and so that the resonant inductor current $i_{Ls}$ is zero, and then the multi-phase boost converting apparatus 10 is configured to operate in the half-type sixth working state.

Please refer to FIG. 1-6 and FIG. 3 at the same time; when the multi-phase boost converting apparatus 10 is configured to operate in the half-type sixth working state, the switch controller 106 is configured to keep turning on the second transistor switch $Q_2$ and keep turning off the first transistor switch $Q_1$, and the second inductor $L_2$ is configured to continue to be excited by the input-end voltage $V_{in}$, and the second inductor current $i_{L2}$ continues to increase, and then the multi-phase boost converting apparatus 10 is configured to operate in the half-type seventh working state.

Please refer to FIG. 1-7 and FIG. 3 at the same time; when the multi-phase boost converting apparatus 10 is configured to operate in the half-type seventh working state, the switch controller 106 is configured to turn off the second transistor switch $Q_2$ and keep turning off the first transistor switch $Q_1$, and the second parasitic capacitor $C_{oss2}$ is configured to be charged by the second inductor current $i_{L2}$ from zero volts, so that a second drain-source voltage $v_{ds2}$ of the second transistor switch $Q_2$ increases gradually, and the second resonant capacitor $C_2$ is configured to discharge, so that the output-end second unidirectional conduction component $D_6$ is configured to be forward-biased conducted, and the second resonant capacitor voltage $v_{C2}$ is discharged from twice the input-end voltage $V_{in}$ to zero volts, and the second drain-source voltage $v_{ds2}$ plus the second resonant capacitor voltage $v_{C2}$ is equal to the output-end voltage $V_o$, and when the second resonant capacitor voltage $v_{C2}$ is discharged to zero volts, the second diode $D_2$ is configured to be forward-biased conducted, and then the multi-phase boost converting apparatus 10 is configured to operate in the half-type eighth working state.

Please refer to FIG. 1-8 and FIG. 3 at the same time; when the multi-phase boost converting apparatus 10 is configured to operate in the half-type eighth working state, the switch controller 106 is configured to keep turning off the second transistor switch $Q_2$ and keep turning off the first transistor switch $Q_1$, and the second diode $D_2$ is configured to continue to be forward-biased conducted by the second inductor current $i_{L2}$, and the resonant inductor current $i_{Ls}$ is zero, and the input-end first unidirectional conduction current $i_{D3}$ is zero, and the input-end second unidirectional conduction current $i_{D4}$ is zero, and the first resonant capacitor current $i_{C1}$ is zero, and the second resonant capacitor current $i_{C2}$ is zero, and the output-end first unidirectional conduction current ins is zero, and the output-end second unidirectional conduction current $i_{D6}$ is zero (namely, no current flows through the components of the passive lossless snubber 104), and the second electric energy stored in the second magnetic field form by the second inductor $L_2$ is transmitted to the output end 108 in the current form, and the second inductor current $i_{L2}$ decreases gradually.

Figure 4A:
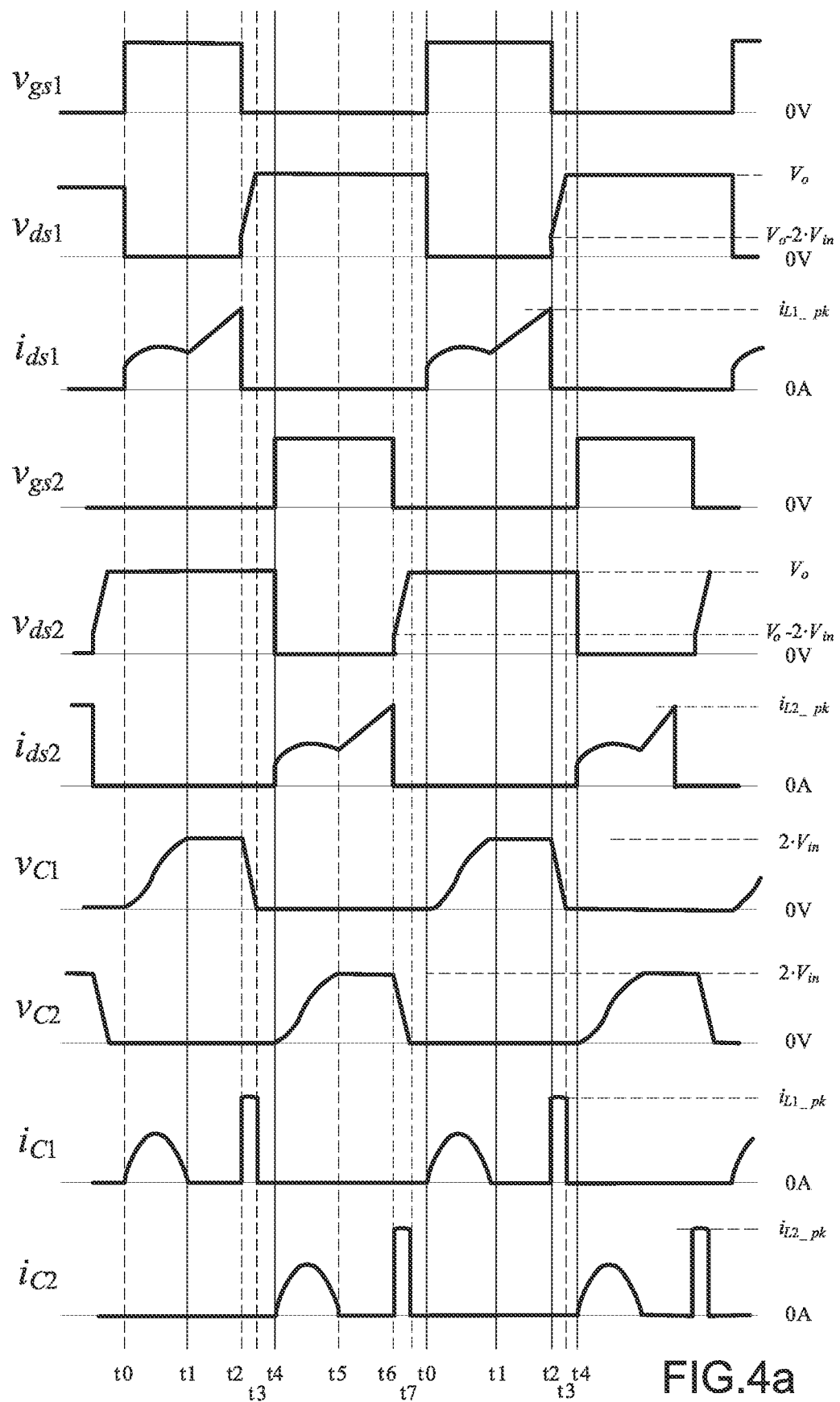
FIG. 4a shows a part of waveform diagrams of the multi-phase boost converting apparatus in the half-type first working state to the half-type eighth working state of the present disclosure.
Figure 4B:
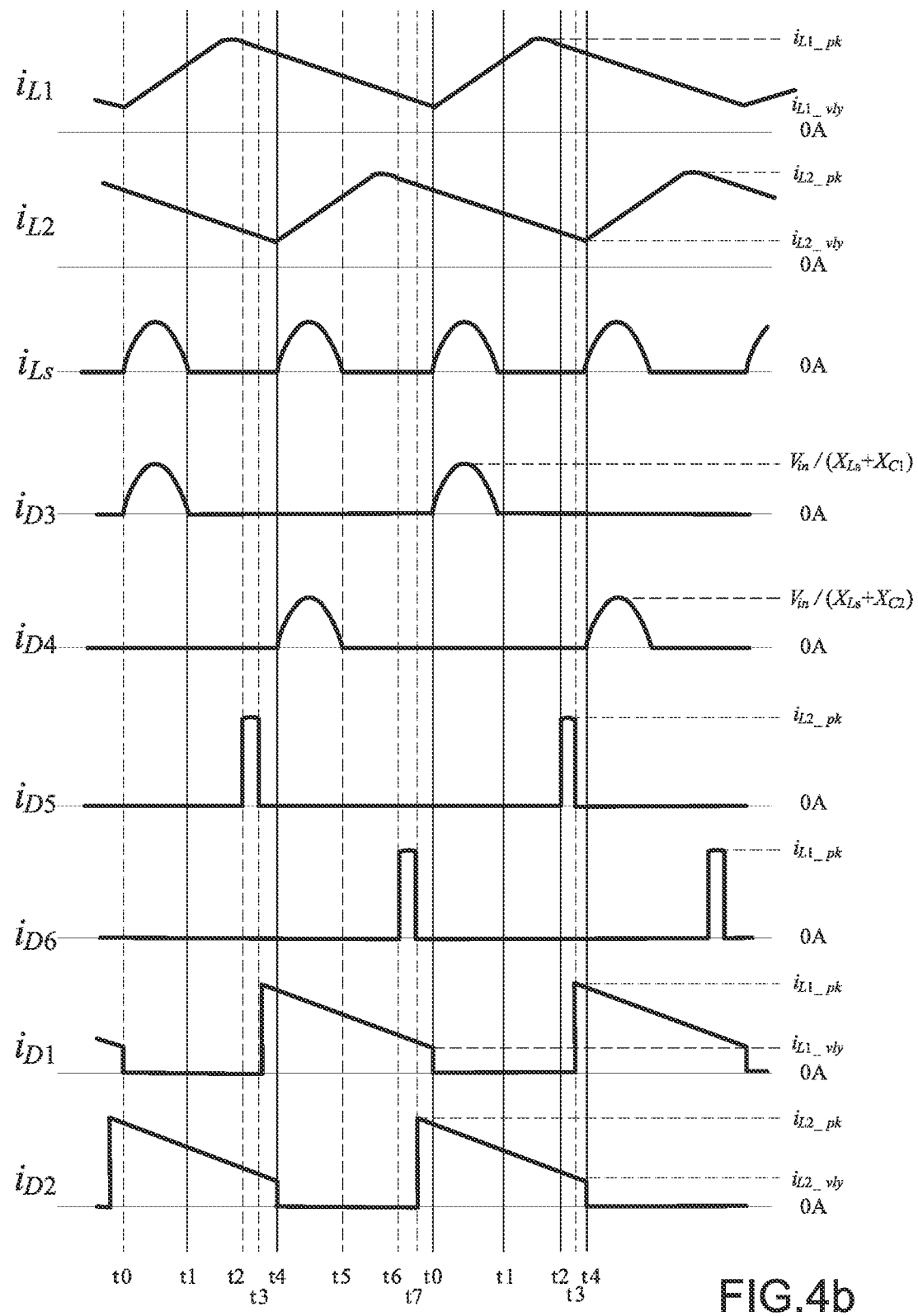
FIG. 4b shows the other part of waveform diagrams of the multi-phase boost converting apparatus in the half-type first working state to the half-type eighth working state of the present disclosure.

FIG. 4a shows a part of waveform diagrams of the multi-phase boost converting apparatus in the half-type first working state to the half-type eighth working state of the present disclosure. FIG. 4b shows the other part of waveform diagrams of the multi-phase boost converting apparatus in the half-type first working state to the half-type eighth working state of the present disclosure. Please refer to FIG. 1-1 to FIG. 1-8 and FIG. 3 at the same time; besides the above-mentioned component symbols, the first transistor switch $Q_1$ has a first gate-source voltage $v_{gs1}$, a current flowing through the first transistor switch $Q_1$ is called a first drain-source current $i_{ds1}$, the second transistor switch $Q_2$ has a second gate-source voltage $v_{gs2}$, a current flowing through the second transistor switch $Q_2$ is called a second drain-source current $i_{ds2}$, a current flowing through the first diode $D_1$ is called a first diode current $i_{D1}$, a current flowing through the second diode $D_2$ called a second diode current $i_{D2}$, the first inductor $L_1$ has a first inductor voltage $v_{L1}$, the second inductor $L_2$ has a second inductor voltage $v_{L2}$, the resonant inductor $L_s$ has a resonant inductor current $v_{Ls}$, a peak current of the first inductor current $i_{L1}$ is a first inductor peak current $i_{L1\_pk}$, a peak current of the second inductor current $i_{L2}$ is a second inductor peak current $i_{L2\_pk}$, a valley current of the first inductor current $i_{L1}$ is a first inductor valley current $i_{L1\_vly}$, a valley current of the second inductor current $i_{L2}$ is a second inductor valley current $i_{L2\_vly}$, the resonant inductor $L_s$ has a resonant inductor inductive reactance $X_{Ls}$, the first resonant capacitor $C_1$ has a first resonant capacitor capacitive reactance $X_{C1}$, the second resonant capacitor $C_2$ has a second resonant capacitor capacitive reactance $X_{C2}$, the half-type first working state is between a zero timing point t0 and a first timing point t1, the half-type second working state is between the first timing point t1 and a second timing point t2, the half-type third working state is between the second timing point t2 and a third timing point t3, the half-type fourth working state is between the third timing point t3 and a fourth timing point t4, the half-type fifth working state is between the fourth timing point t4 and a fifth timing point t5, the half-type sixth working state is between the fifth timing point t5 and a sixth timing point t6, the half-type seventh working state is between the sixth timing point t6 and a seventh timing point t7, and the half-type eighth working state is between the seventh timing point t7 and the zero timing point t0.

Then, the full-type operation of the present disclosure is described in detail as follows:

Please refer to FIG. 3 again; when the switch controller 106 is configured to transmit the pulse width modulation signal 112 to the first transistor switch $Q_1$ to drive the first transistor switch $Q_1$ and the duty cycle of the pulse width modulation signal 112 is greater than or equal to 50%, or when the switch controller 106 is configured to transmit the pulse width modulation signal 112 to the second transistor switch $Q_2$ to drive the second transistor switch $Q_2$ and the duty cycle of the pulse width modulation signal 112 is greater than or equal to 50%, the multi-phase boost converting apparatus 10 is configured to sequentially operate in a full-type first working state, a full-type second working state, a full-type third working state, a full-type fourth working state, a full-type fifth working state, a full-type sixth working state, a full-type seventh working state and a full-type eighth working state.

FIG. 2-1 to FIG. 2-8 respectively show the multi-phase boost converting apparatus in the full-type first working state to the full-type eighth working state of the present disclosure, wherein the dashed arrows are the directions of the currents, and for the sake of brevity, some components and symbols which are shown in FIG. 3 are omitted in FIG. 2-1 to FIG. 2-8, while the symbol ON next to the transistor switches means that the transistor switch is turned on, and the symbol OFF means that the transistor switch is turned off.

Please refer to FIG. 2-1 and FIG. 3 at the same time; when the multi-phase boost converting apparatus 10 is configured to operate in the full-type first working state, the switch controller 106 is configured to turn on the first transistor switch $Q_1$ and keep turning on the second transistor switch $Q_2$, and the first inductor $L_1$ is configured to be excited by an input-end voltage $V_{in}$ of the input end 110 to store a first electric energy in a first magnetic field form, and the second inductor $L_2$ is configured to be excited by the input-end voltage $V_{in}$ to store a second electric energy in a second magnetic field form, and a first inductor current $i_{L1}$ flowing through the first inductor $L_1$ increases gradually, and a second inductor current $i_{L2}$ flowing through the second inductor $L_2$ increases gradually, and the resonant inductor $L_s$ and the first resonant capacitor $C_1$ are configured to be charged by the input-end voltage $V_{in}$ and to resonate, and the first inductor $L_1$ is configured to be continuously excited by the input-end voltage $V_{in}$ to cause the first inductor current $i_{L1}$ to continuously increase, and the second inductor $L_2$ is configured to be continuously excited by the input-end voltage $V_{in}$ to cause the second inductor current $i_{L2}$ to continuously increase, and then the multi-phase boost converting apparatus 10 is configured to operate in the full-type second working state.

Please refer to FIG. 2-2 and FIG. 3 at the same time; when the multi-phase boost converting apparatus 10 is configured to operate in the full-type second working state, the switch controller 106 is configured to keep turning on the first transistor switch $Q_1$ and turn off the second transistor switch $Q_2$, and the first inductor $L_1$ is configured to continue to be excited by the input-end voltage $V_{in}$, and the first inductor current $i_{L1}$ continues to increase, and the resonant inductor $L_s$ and the first resonant capacitor $C_1$ are configured to be charged by the input-end voltage $V_{in}$ and to resonate, and the second parasitic capacitor $C_{oss2}$ is configured to be charged by the second inductor current $i_{L2}$ from zero volts, so that a second drain-source voltage $v_{ds2}$ of the second transistor switch $Q_2$ increases gradually, and the second resonant capacitor $C_2$ is configured to discharge, and the second drain-source voltage $v_{ds2}$ plus a second resonant capacitor voltage $v_{C2}$ of the second resonant capacitor $C_2$ is equal to an output-end voltage $V_o$ of the output end 108, and then the multi-phase boost converting apparatus 10 is configured to operate in the full-type third working state.

Please refer to FIG. 2-3 and FIG. 3 at the same time; when the multi-phase boost converting apparatus 10 is configured to operate in the full-type third working state, the switch controller 106 is configured to keep turning off the second transistor switch $Q_2$ and keep turning on the first transistor switch $Q_1$, and the first inductor $L_1$ is configured to continue to be excited by the input-end voltage $V_{in}$, and the first inductor current $i_{L1}$ continues to increase, and the resonant inductor $L_s$ and the first resonant capacitor $C_1$ are configured to be charged by the input-end voltage $V_{in}$ and to resonate, and the input-end first unidirectional conduction component $D_3$ is configured to enable the resonant inductor $L_s$ and the first resonant capacitor $C_1$ to be configured to resonate for a half cycle and then stop resonating, so that a first resonant capacitor voltage $v_{C1}$ of the first resonant capacitor $C_1$ is twice the input-end voltage $V_{in}$, and so that a resonant inductor current $i_{Ls}$ flowing through the resonant inductor $L_s$ is zero, and the second inductor current $i_{L2}$ discharges the second resonance capacitor $C_2$, and when the second resonant capacitor voltage $v_{C2}$ is discharged from twice the input-end voltage $V_{in}$ to zero volts, the second diode $D_2$ is configured to be forward-biased conducted, and the second drain-source voltage $v_{ds2}$ plus the second resonant capacitor voltage $v_{C2}$ is equal to the output-end voltage $V_o$, and then the multi-phase boost converting apparatus 10 is configured to operate in the full-type fourth working state.

Figures 1, 2, 3, 4:
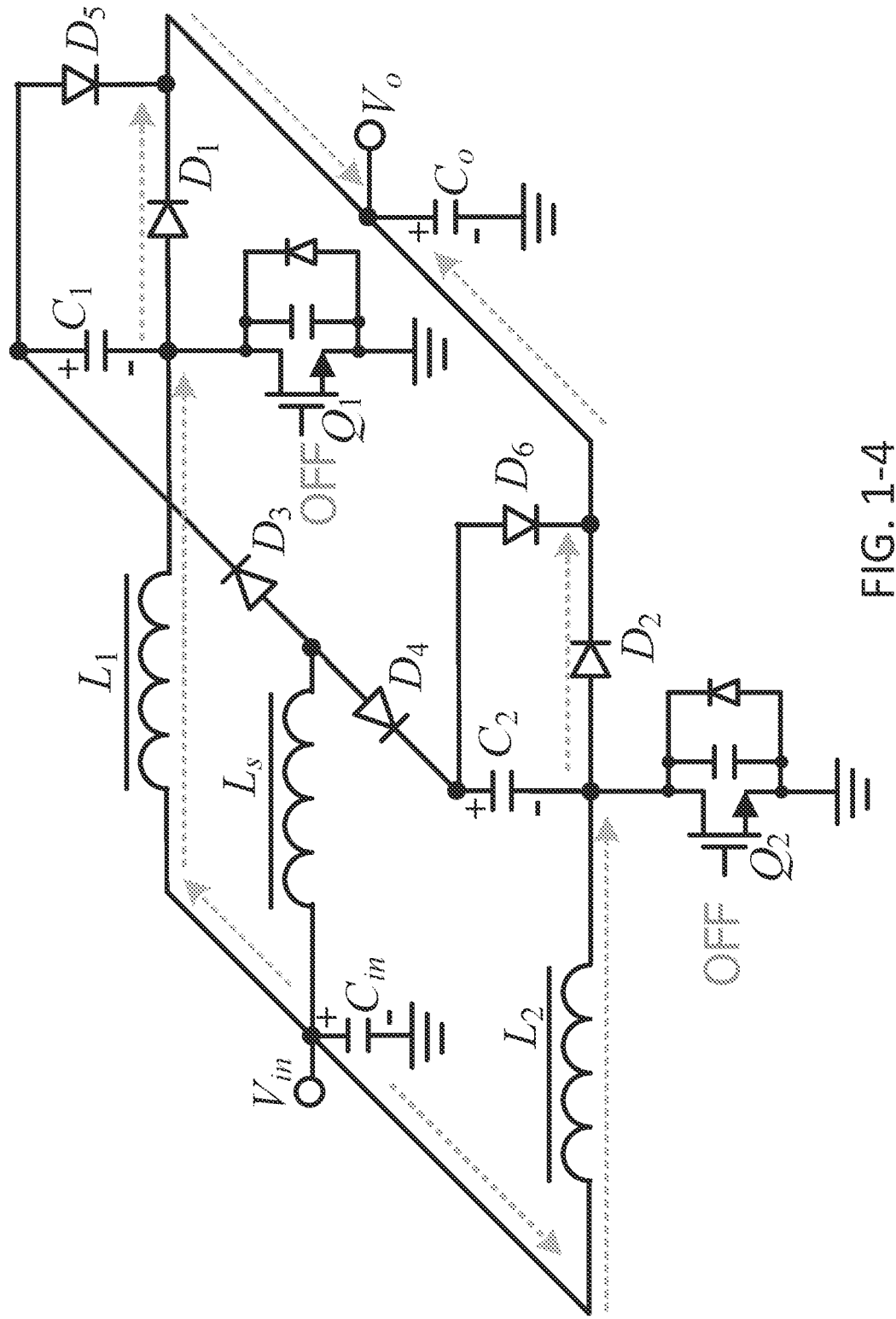
Figures 1, 2, 3, 4, 5:
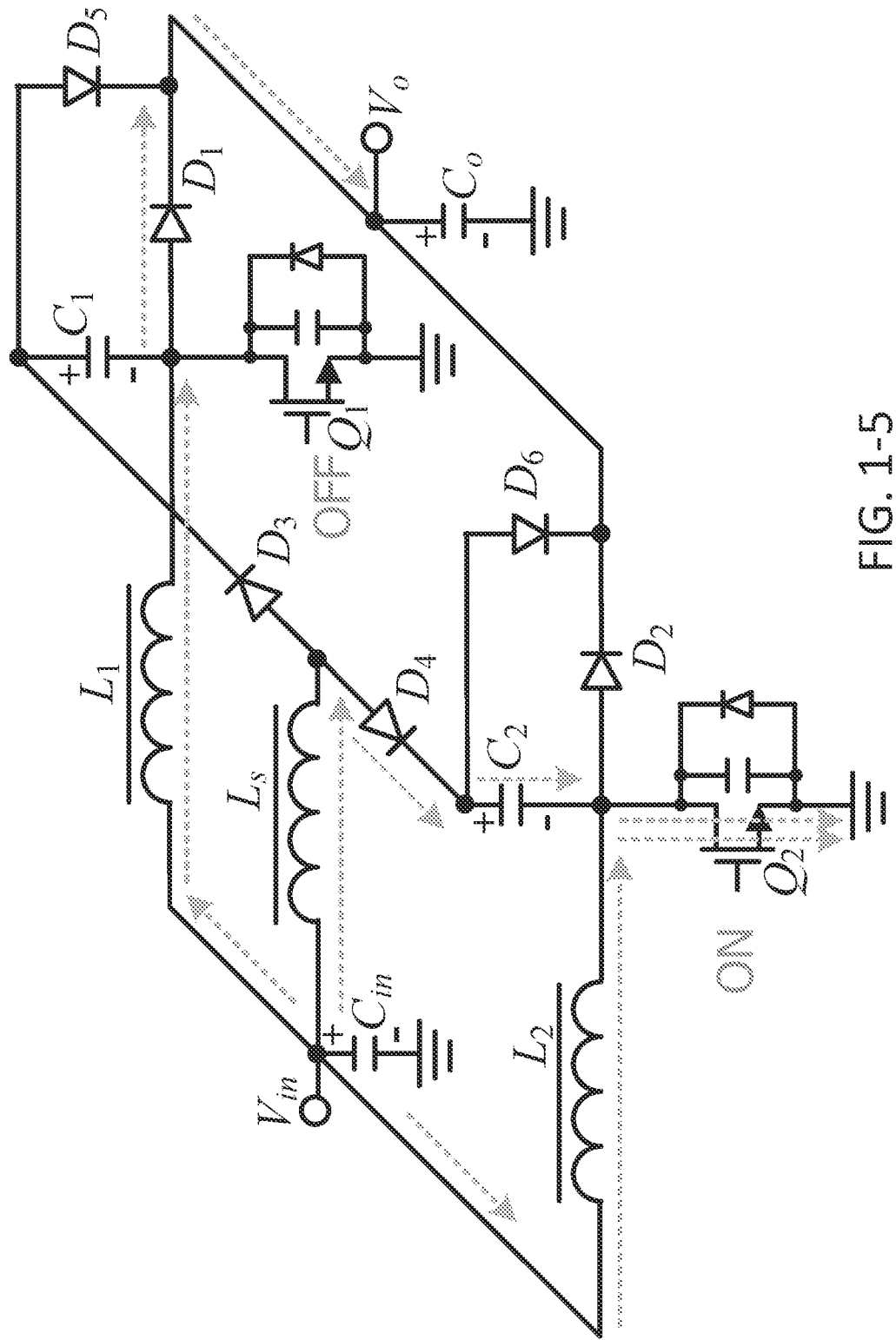
Figures 1, 2, 3, 4, 5, 6:
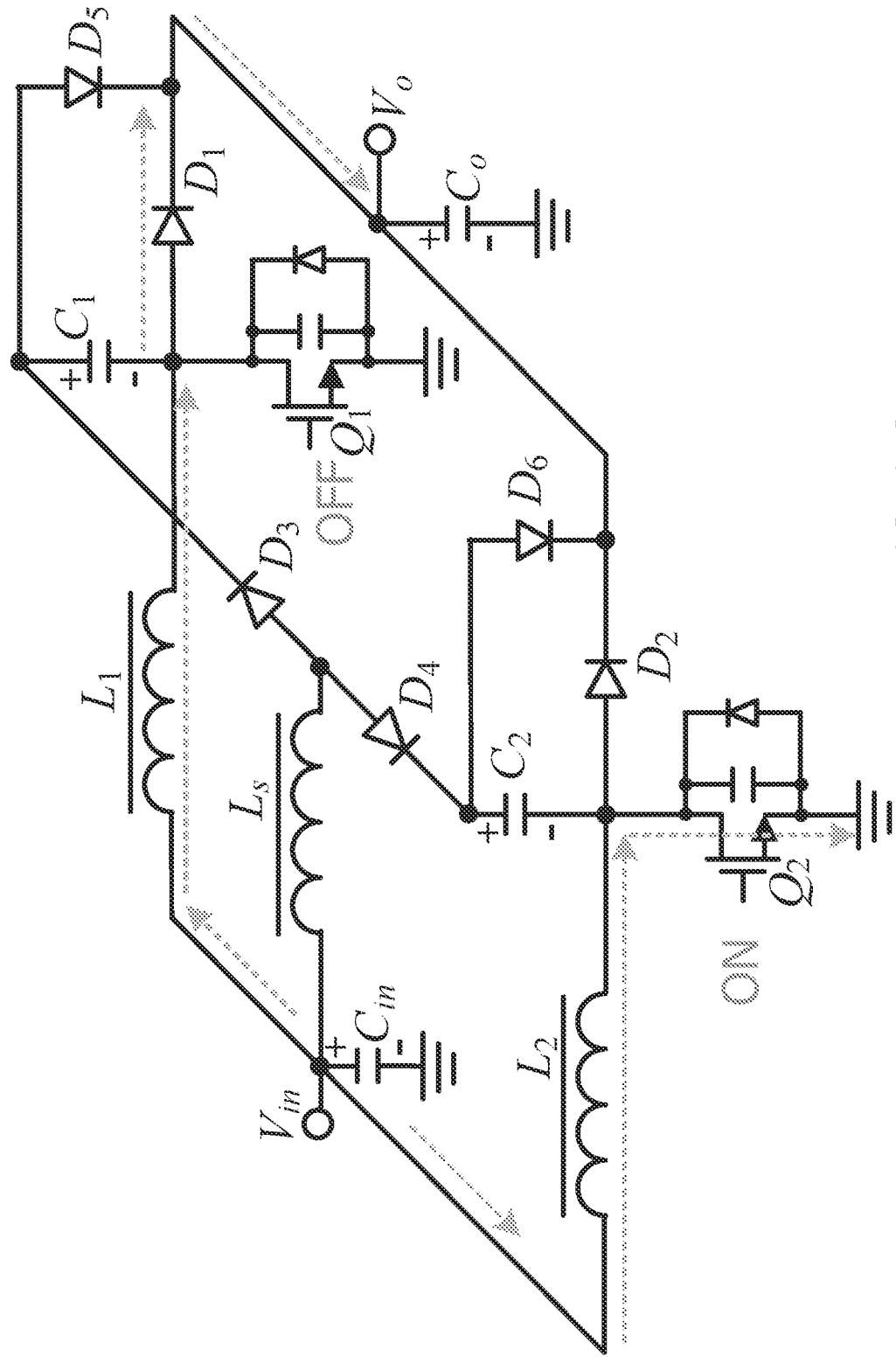
Figures 1, 2, 3, 4, 5, 6, 7:
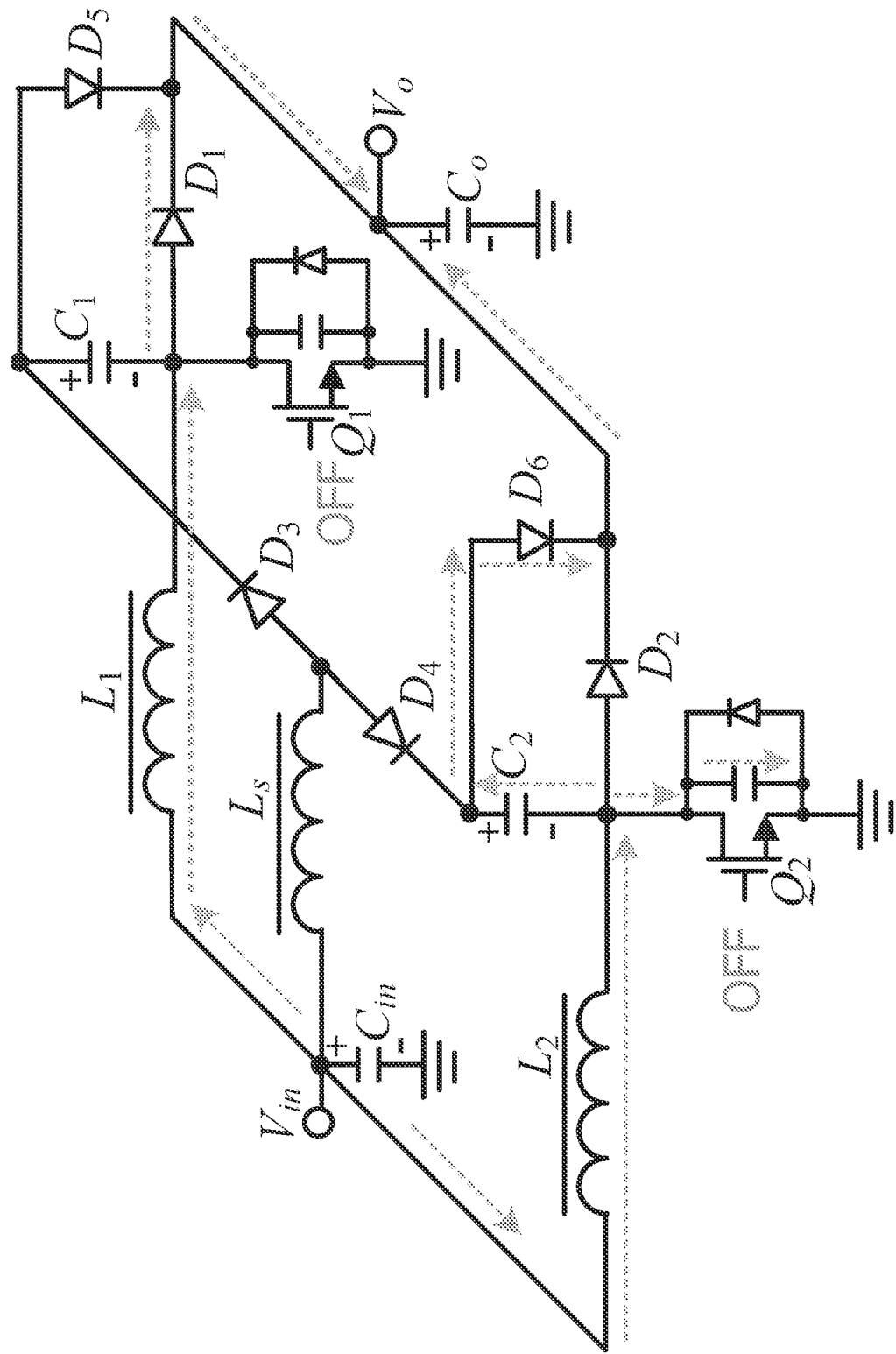
Figures 1, 2, 3, 4, 5, 6, 7, 8:
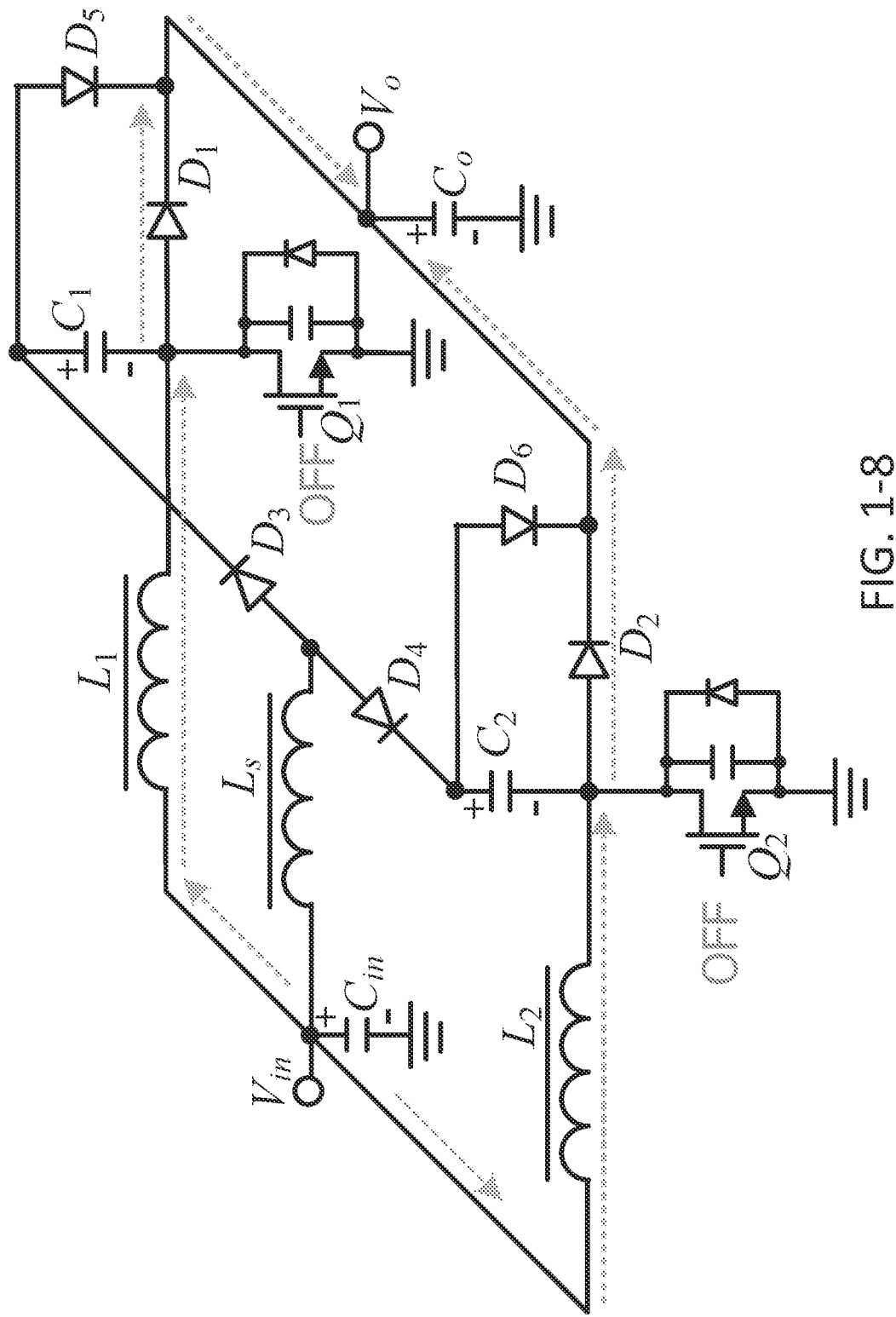
Figures 1, 2:
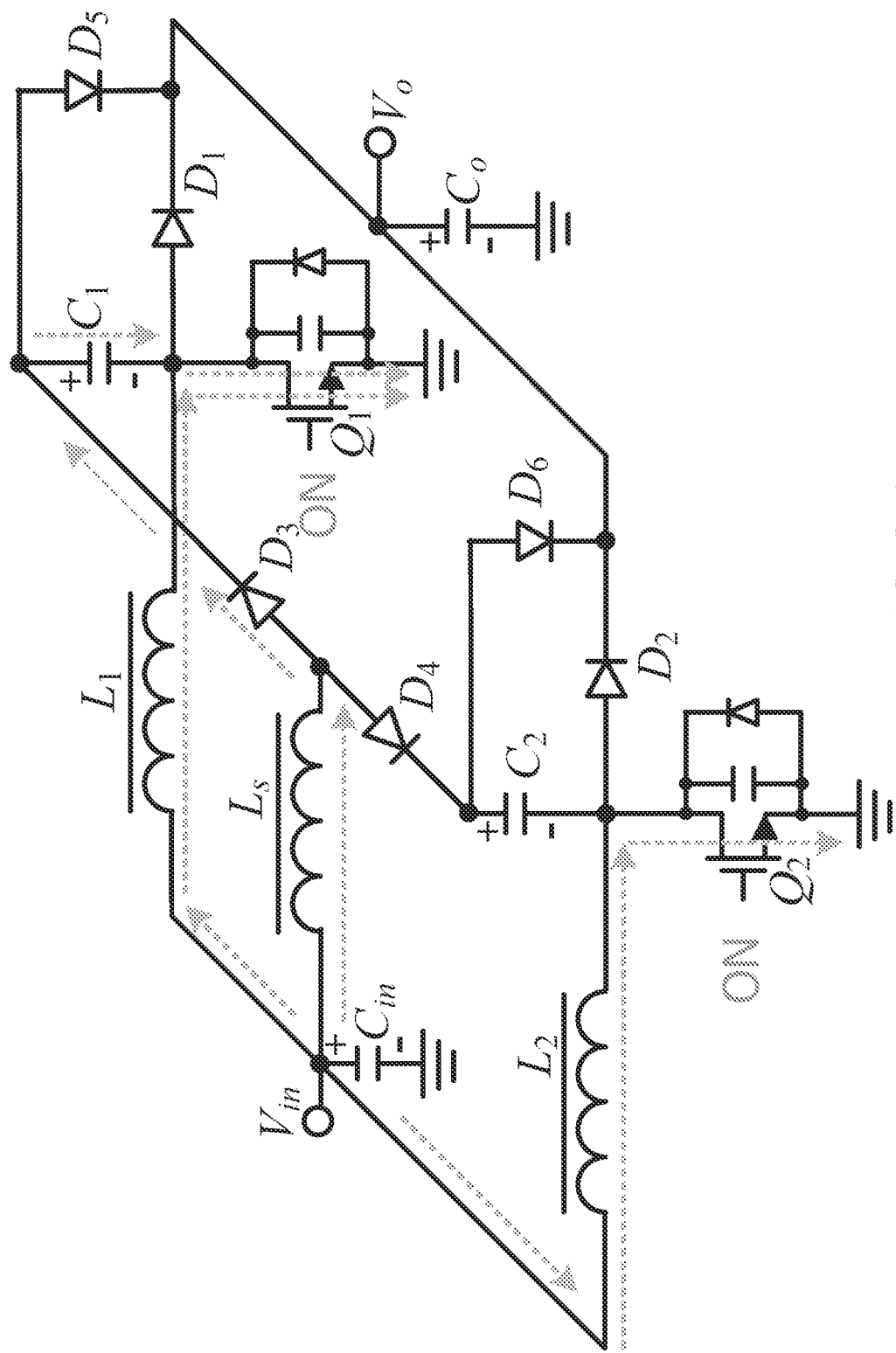
Figure 2:
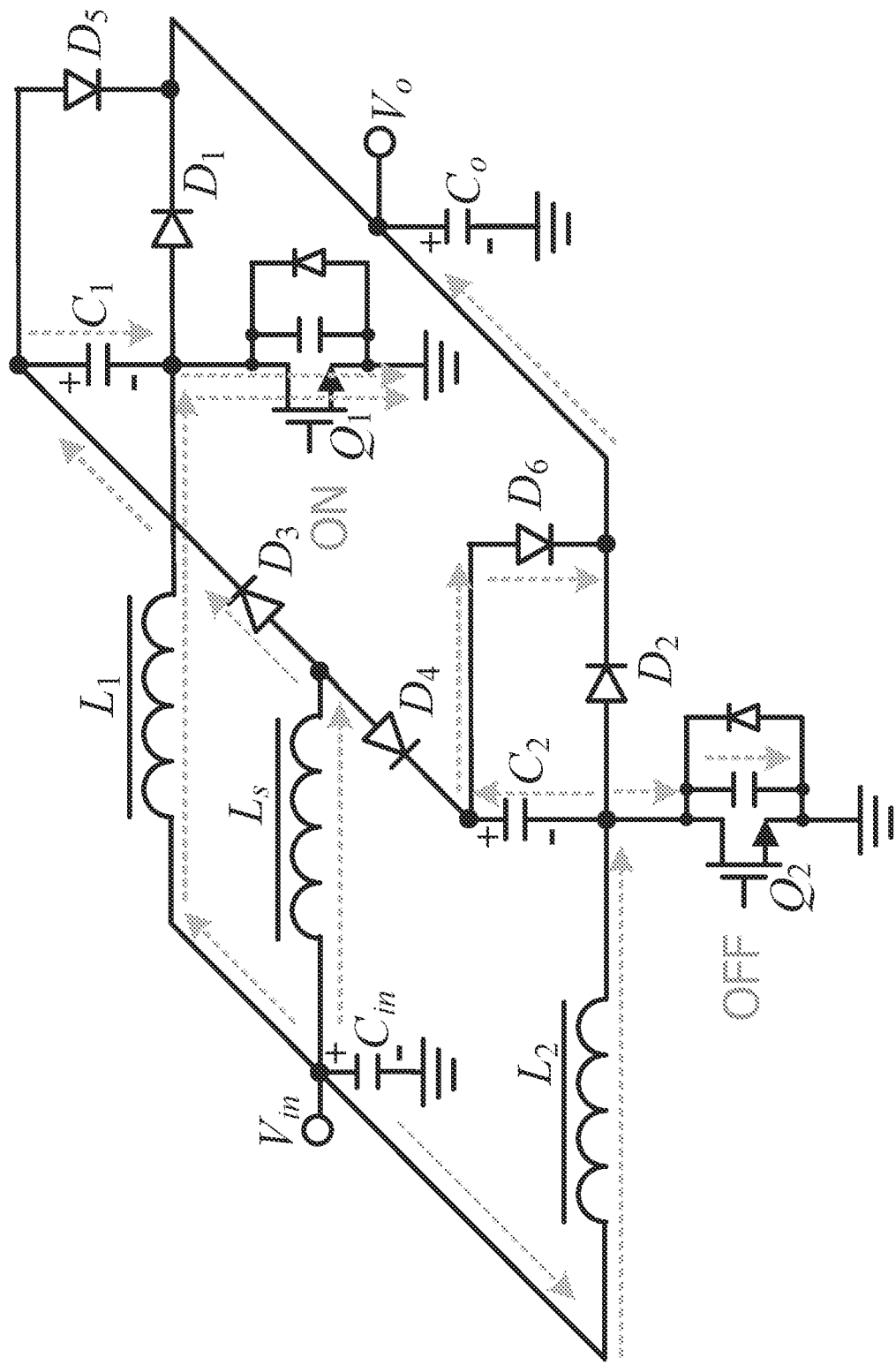
Figures 2, 3:
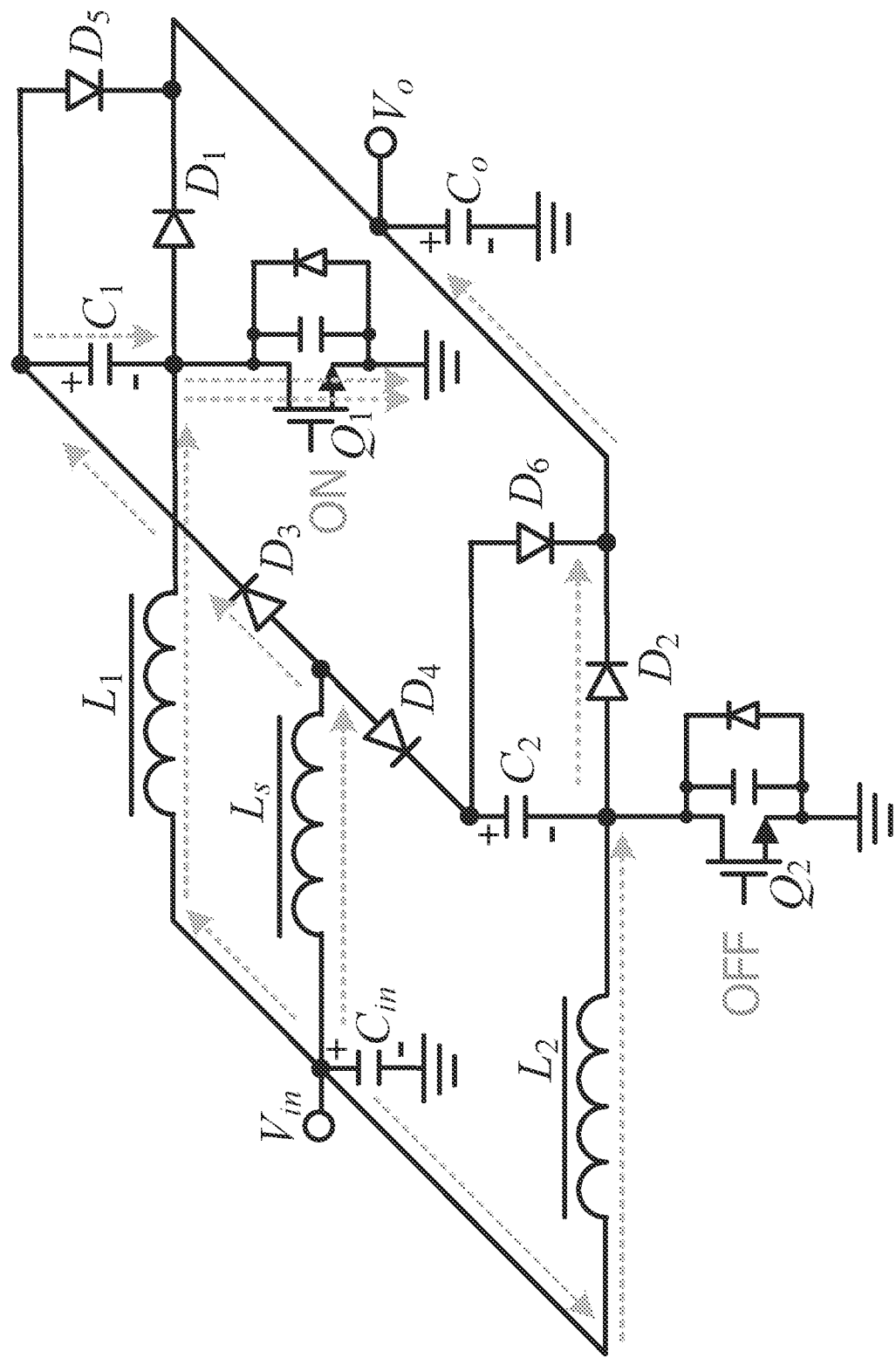
Figures 2, 3, 4:
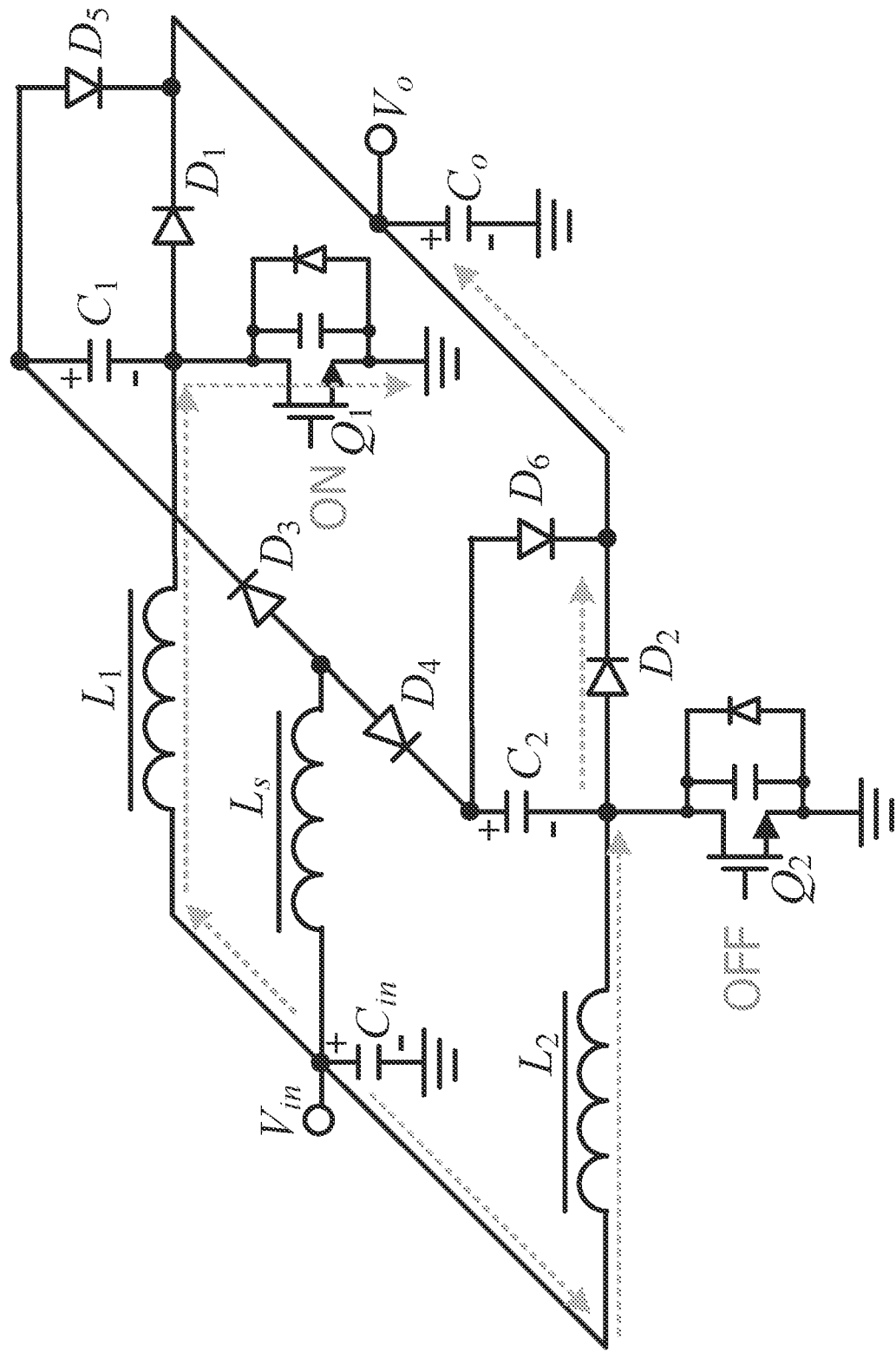
Figures 2, 3, 4, 5:
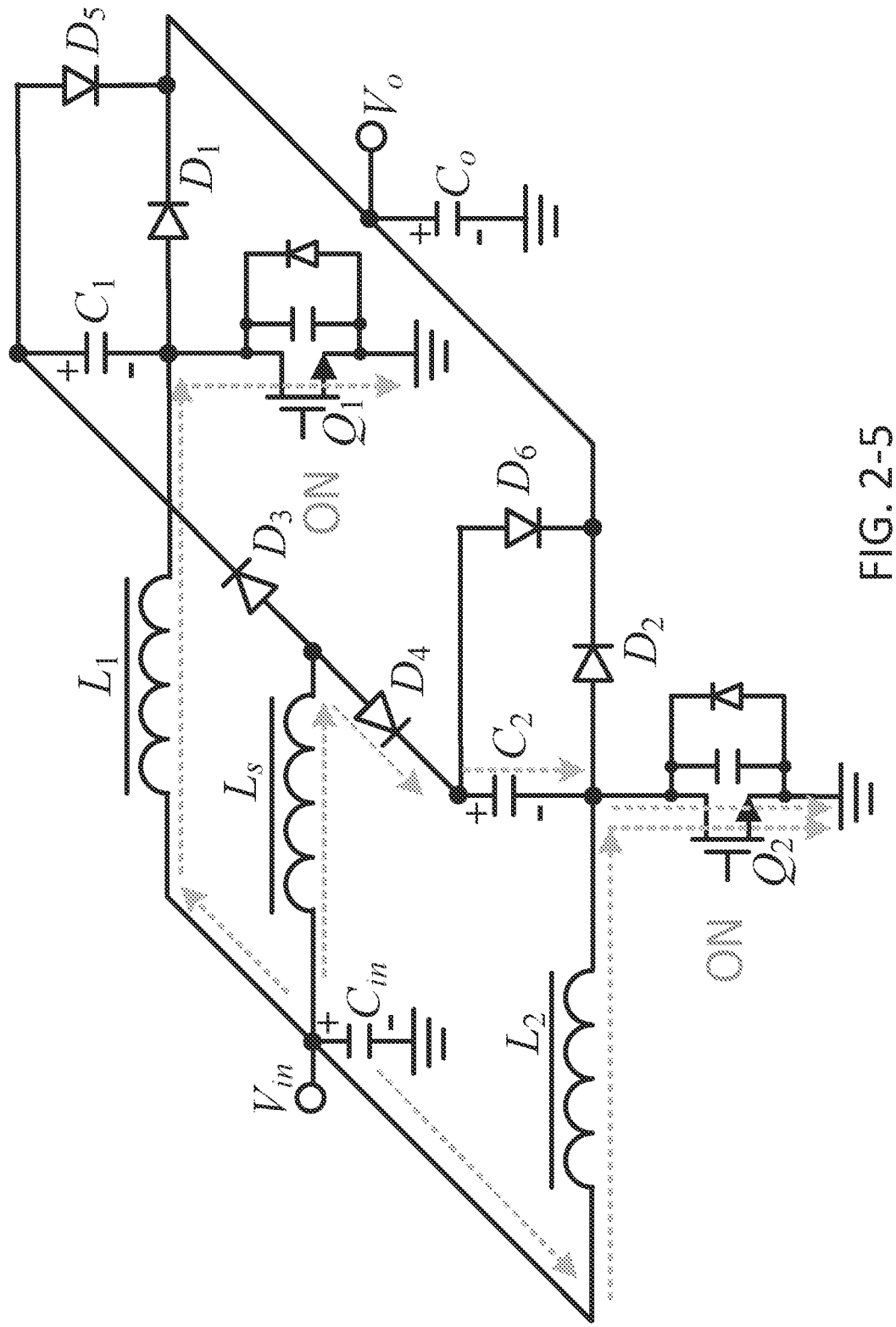
Figures 2, 3, 4, 5, 6:
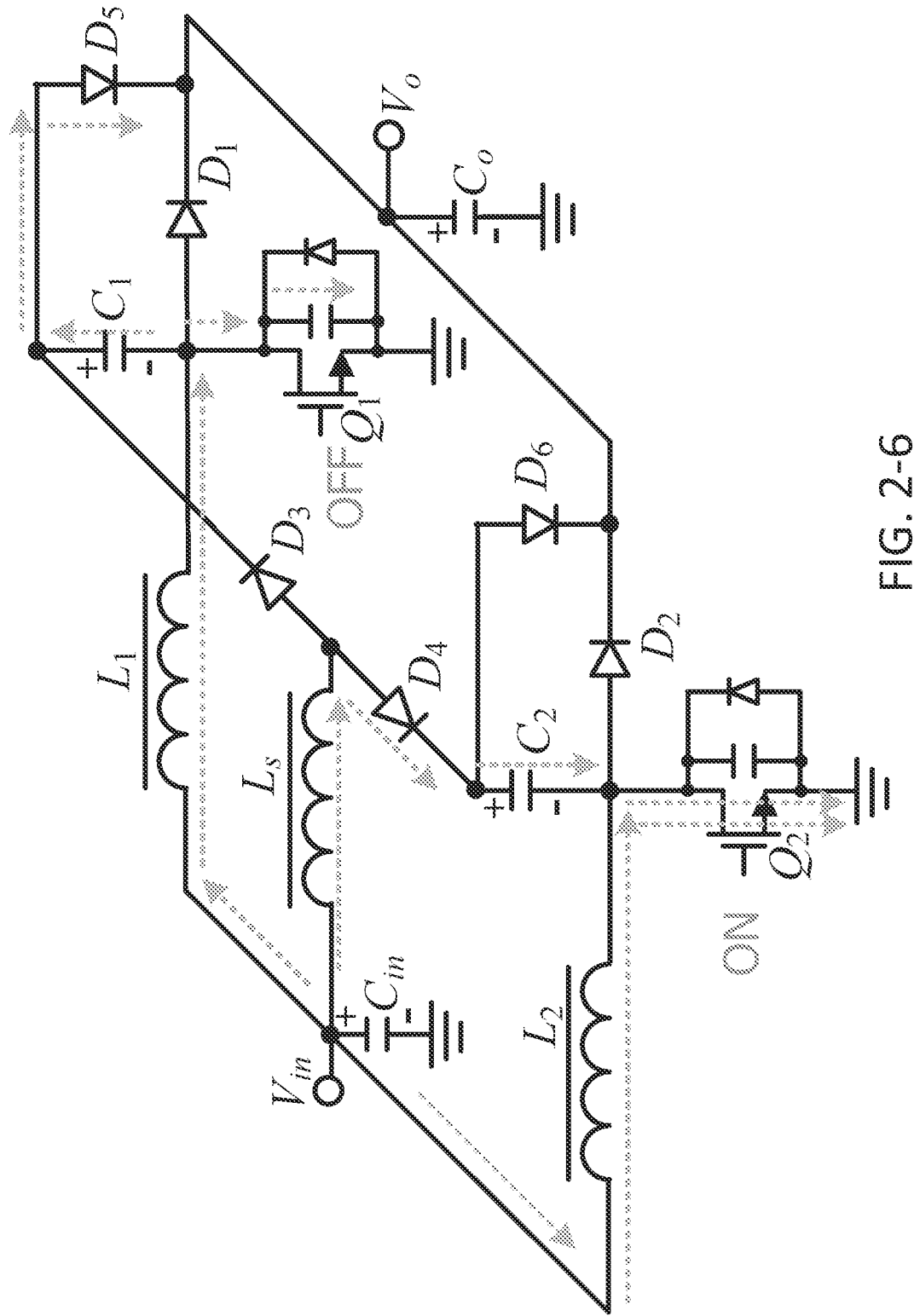
Figures 2, 3, 4, 5, 6, 7:
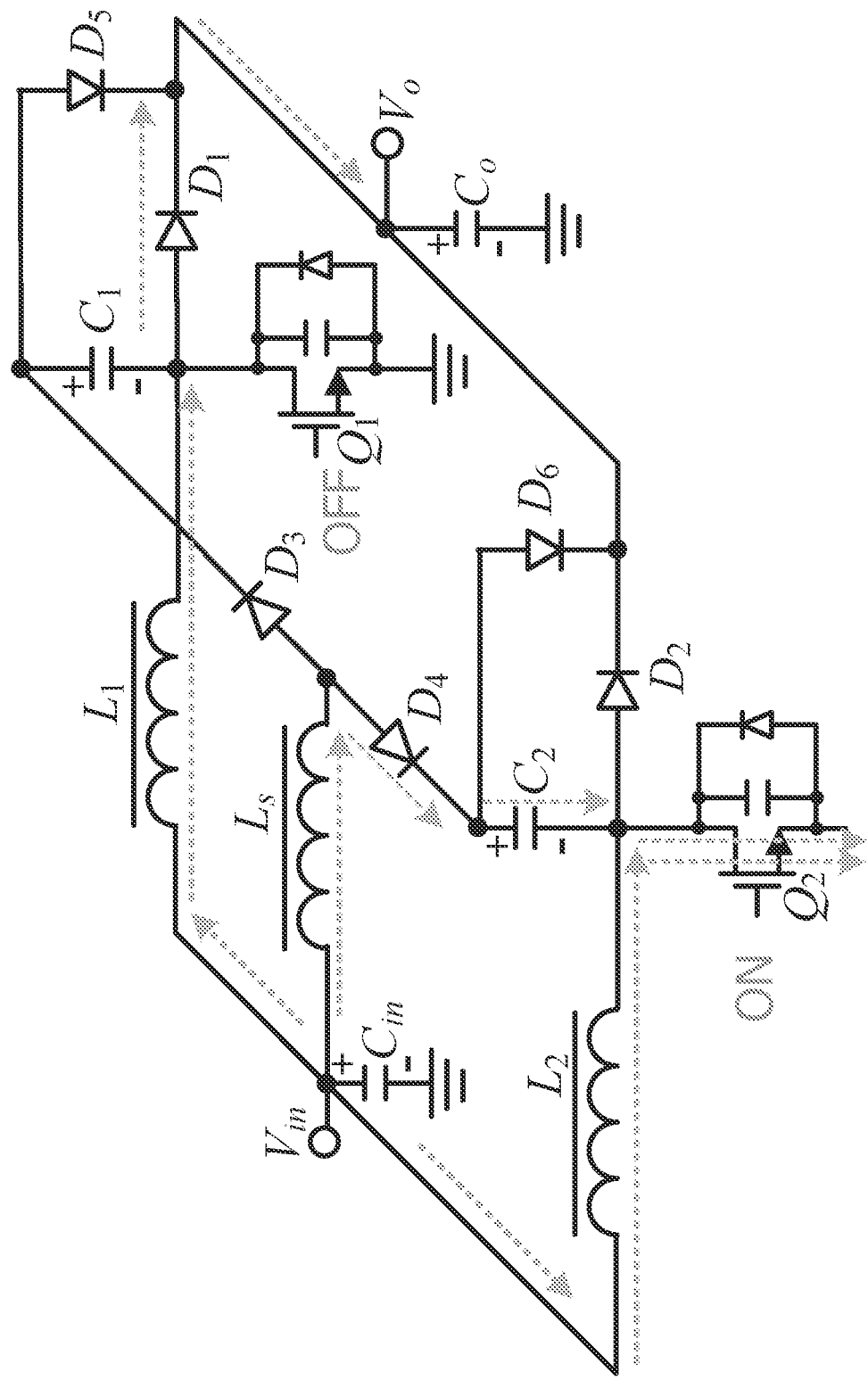
Figures 2, 3, 4, 5, 6, 7, 8:
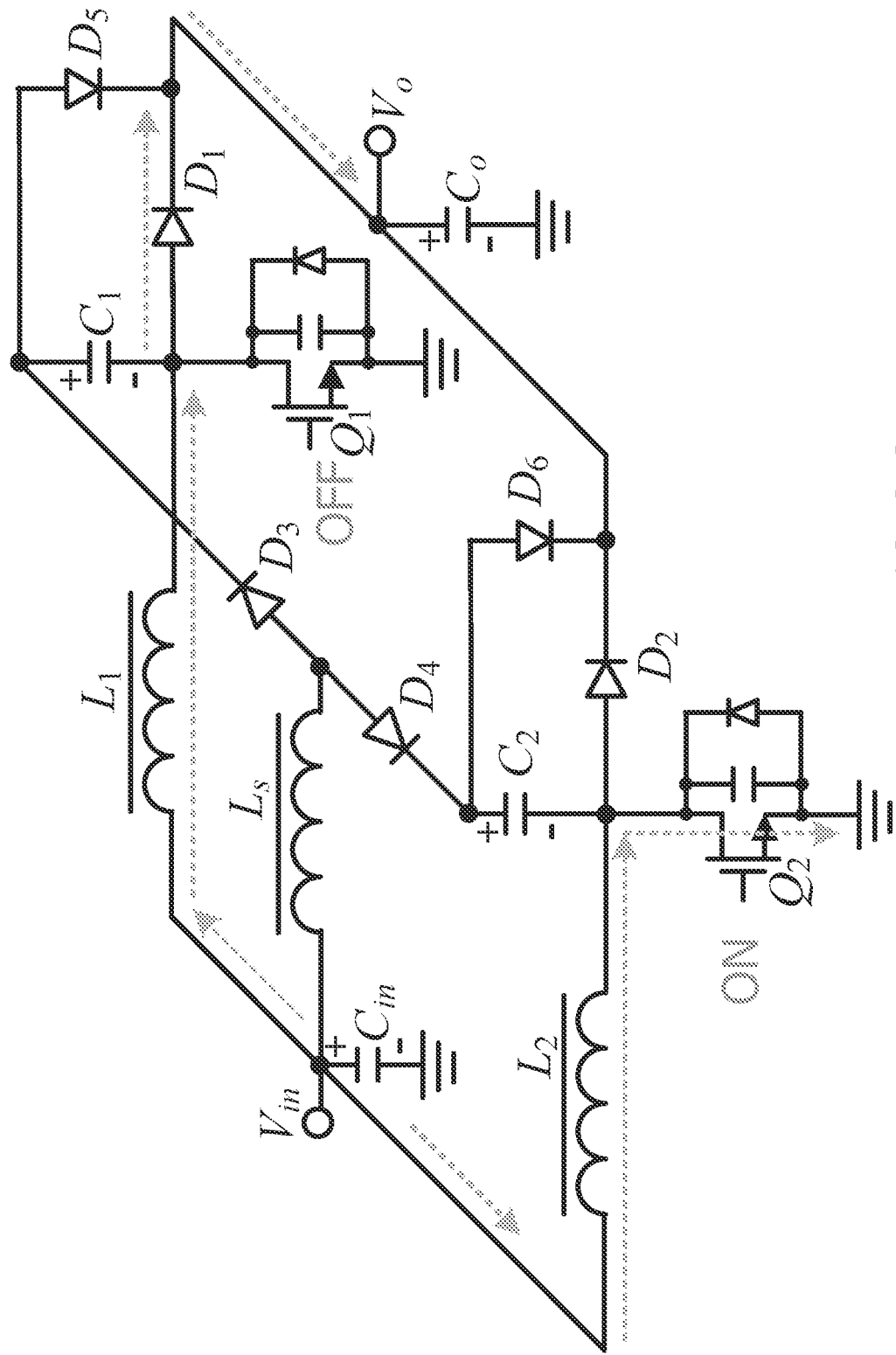
Figure 3:
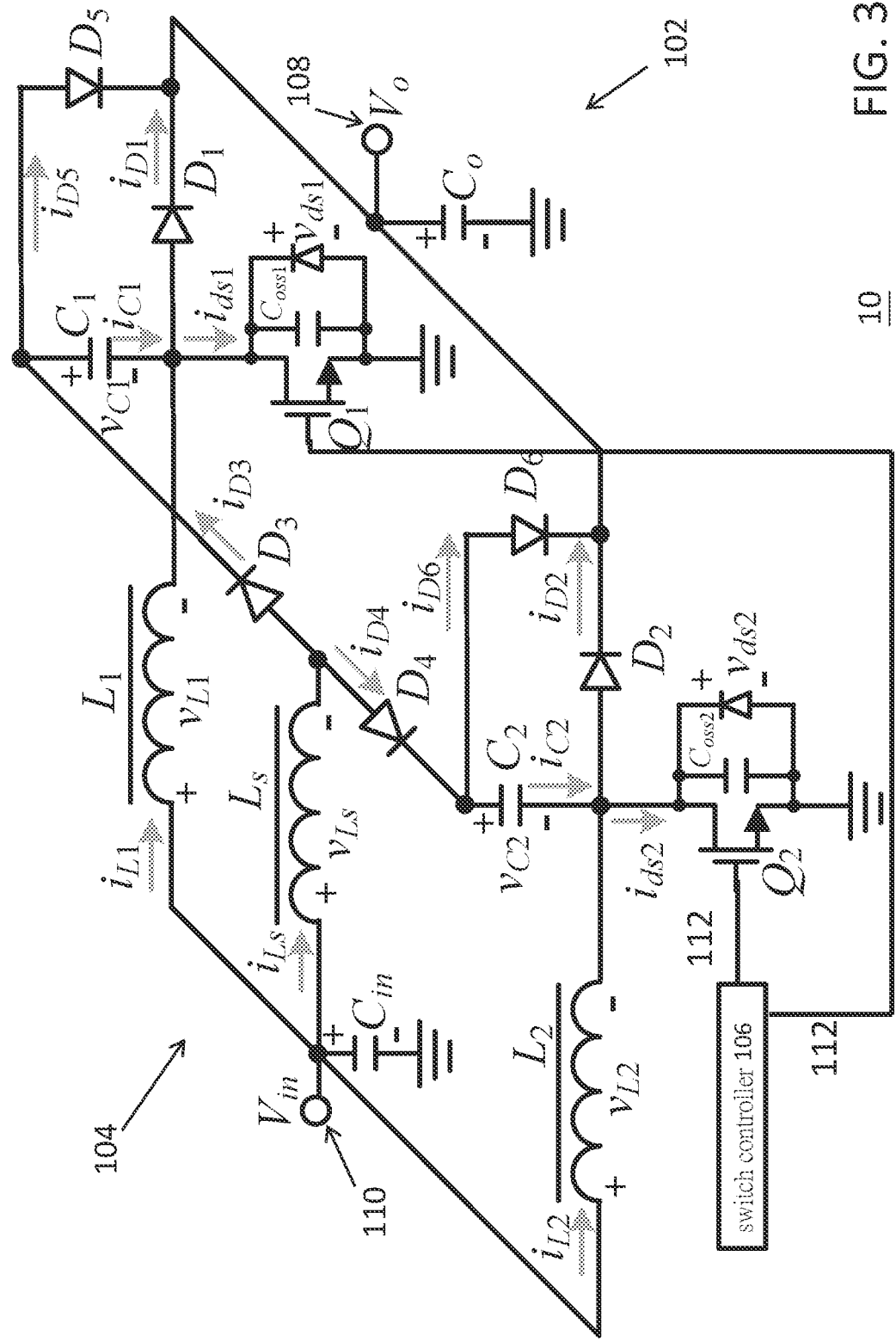

Please refer to FIG. 2-4 and FIG. 3 at the same time; when the multi-phase boost converting apparatus 10 is configured to operate in the full-type fourth working state, the switch controller 106 is configured to keep turning off the second transistor switch $Q_2$ and keep turning on the first transistor switch $Q_1$, and the second diode $D_2$ is configured to continue to be forward-biased conducted by the second inductor current $i_{L2}$, and the resonant inductor current $i_{Ls}$ is zero, and an input-end first unidirectional conduction current $i_{D3}$ flowing through the input-end first unidirectional conduction component $D_3$ is zero, and an input-end second unidirectional conduction current $i_{D4}$ flowing through the input-end second unidirectional conduction component $D_4$ is zero, and a first resonant capacitor current $i_{C1}$ flowing through the first resonant capacitor $C_1$ is zero, and a second resonant capacitor current $i_{C2}$ flowing through the second resonant capacitor $C_2$ is zero, and an output-end first unidirectional conduction current $i_{D5}$ flowing through the output-end first unidirectional conduction component $D_5$ is zero, and an output-end second unidirectional conduction current $i_{D6}$ flowing through the output-end second unidirectional conduction component $D_6$ is zero (namely, no current flows through the components of the passive lossless snubber 104), and the second electric energy stored in the second magnetic field form by the second inductor $L_2$ is transmitted to the output end 108 in a current form, and the second inductor current $i_{L2}$ decreases gradually, and the first inductor $L_1$ is configured to be excited by the input-end voltage $V_{in}$, and the first inductor current $i_{L1}$ increases, and then the multi-phase boost converting apparatus 10 is configured to operate in the full-type fifth working state.

Please refer to FIG. 2-5 and FIG. 3 at the same time; when the multi-phase boost converting apparatus 10 is configured to operate in the full-type fifth working state, the switch controller 106 is configured to turn on the second transistor switch $Q_2$ and keep turning on the first transistor switch $Q_1$, and the first inductor $L_1$ is configured to be excited by the input-end voltage $V_{in}$ to store the first electric energy in the first magnetic field form, and the second inductor $L_2$ is configured to be excited by the input-end voltage $V_{in}$ to store the second electric energy in the second magnetic field form, and the first inductor current $i_{L1}$ increases gradually, and the second inductor current $i_{L2}$ increases gradually, and the resonant inductor $L_s$ and the second resonant capacitor $C_2$ are configured to be charged by the input-end voltage $V_{in}$ and to resonate, and then the multi-phase boost converting apparatus 10 is configured to operate in the full-type sixth working state.

Please refer to FIG. 2-6 and FIG. 3 at the same time; when the multi-phase boost converting apparatus 10 is configured to operate in the full-type sixth working state, the switch controller 106 is configured to keep turning on the second transistor switch $Q_2$ and turn off the first transistor switch $Q_1$, and the second inductor $L_2$ is configured to continue to be excited by the input-end voltage $V_{in}$, and the second inductor current $i_{L2}$ continues to increase, and the first parasitic capacitor $C_{oss1}$ is configured to be charged by the first inductor current $i_{L1}$ from zero volts, so that a first drain-source voltage $v_{ds1}$ of the first transistor switch $Q_1$ increases gradually, and the first resonant capacitor $C_1$ is configured to discharge, and the first drain-source voltage $v_{ds1}$ plus the first resonant capacitor voltage $v_{C1}$ is equal to the output-end voltage $V_o$, and then the multi-phase boost converting apparatus 10 is configured to operate in the full-type seventh working state.

Please refer to FIG. 2-7 and FIG. 3 at the same time; when the multi-phase boost converting apparatus 10 is configured to operate in the full-type seventh working state, the switch controller 106 is configured to keep turning on the second transistor switch $Q_2$ and keep turning off the first transistor switch $Q_1$, and the second inductor $L_2$ is configured to continue to be excited by the input-end voltage $V_{in}$, and the second inductor current $i_{L2}$ continues to increase, and the resonant inductor $L_s$ and the second resonant capacitor $C_2$ are configured to be charged by the input-end voltage $V_{in}$ and to resonate, and the input-end second unidirectional conduction component $D_4$ is configured to enable the resonant inductor $L_s$ and the second resonant capacitor $C_2$ to be configured to resonate for the half cycle and then stop resonating, so that the second resonant capacitor voltage $v_{C2}$ is twice the input-end voltage $V_{in}$, and so that the resonant inductor current $i_{Ls}$ is zero, and the first inductor current $i_{L1}$ discharges the first resonance capacitor $C_1$, and when the first resonant capacitor voltage $v_{C1}$ is discharged from twice the input-end voltage $V_{in}$ to zero volts, the first diode $D_1$ is configured to be forward-biased conducted, and then the multi-phase boost converting apparatus 10 is configured to operate in the full-type eighth working state.

Please refer to FIG. 2-8 and FIG. 3 at the same time; when the multi-phase boost converting apparatus 10 is configured to operate in the full-type eighth working state, the switch controller 106 is configured to keep turning on the second transistor switch $Q_2$ and keep turning off the first transistor switch $Q_1$, and the first diode $D_1$ is configured to continue to be forward-biased conducted by the first inductor current $i_{L1}$, and the first inductor current $i_{L1}$ is transmitted to the output end 108 to be demagnetized, and the first inductor current $i_{L1}$ decreases gradually, and the second inductor $L_2$ is configured to be continuously excited by the input-end voltage $V_{in}$ to cause the second inductor current $i_{L2}$ to continuously increase, and the resonant inductor current $i_{Ls}$ is zero, and the input-end first unidirectional conduction current $i_{D3}$ is zero, and the input-end second unidirectional conduction current $i_{D4}$ is zero, and the first resonant capacitor current $i_{C1}$ is zero, and the second resonant capacitor current $i_{C2}$ is zero, and the output-end first unidirectional conduction current $i_{D5}$ is zero, and the output-end second unidirectional conduction current $i_{D6}$ is zero (namely, no current flows through the components of the passive lossless snubber 104).

Figure 5A:
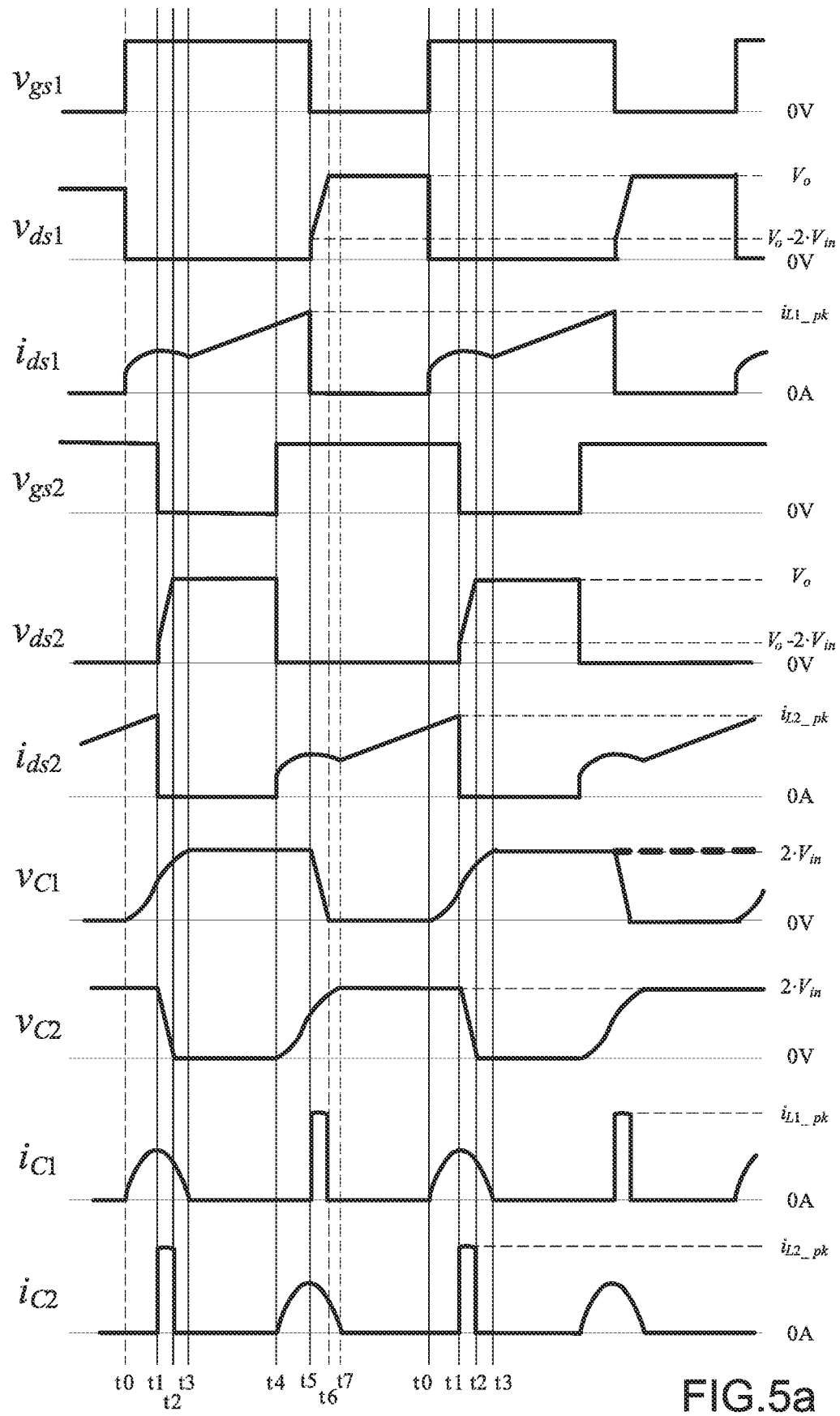
FIG. 5a shows a part of waveform diagrams of the multi-phase boost converting apparatus in the full-type first working state to the full-type eighth working state of the present disclosure.
Figure 5B:
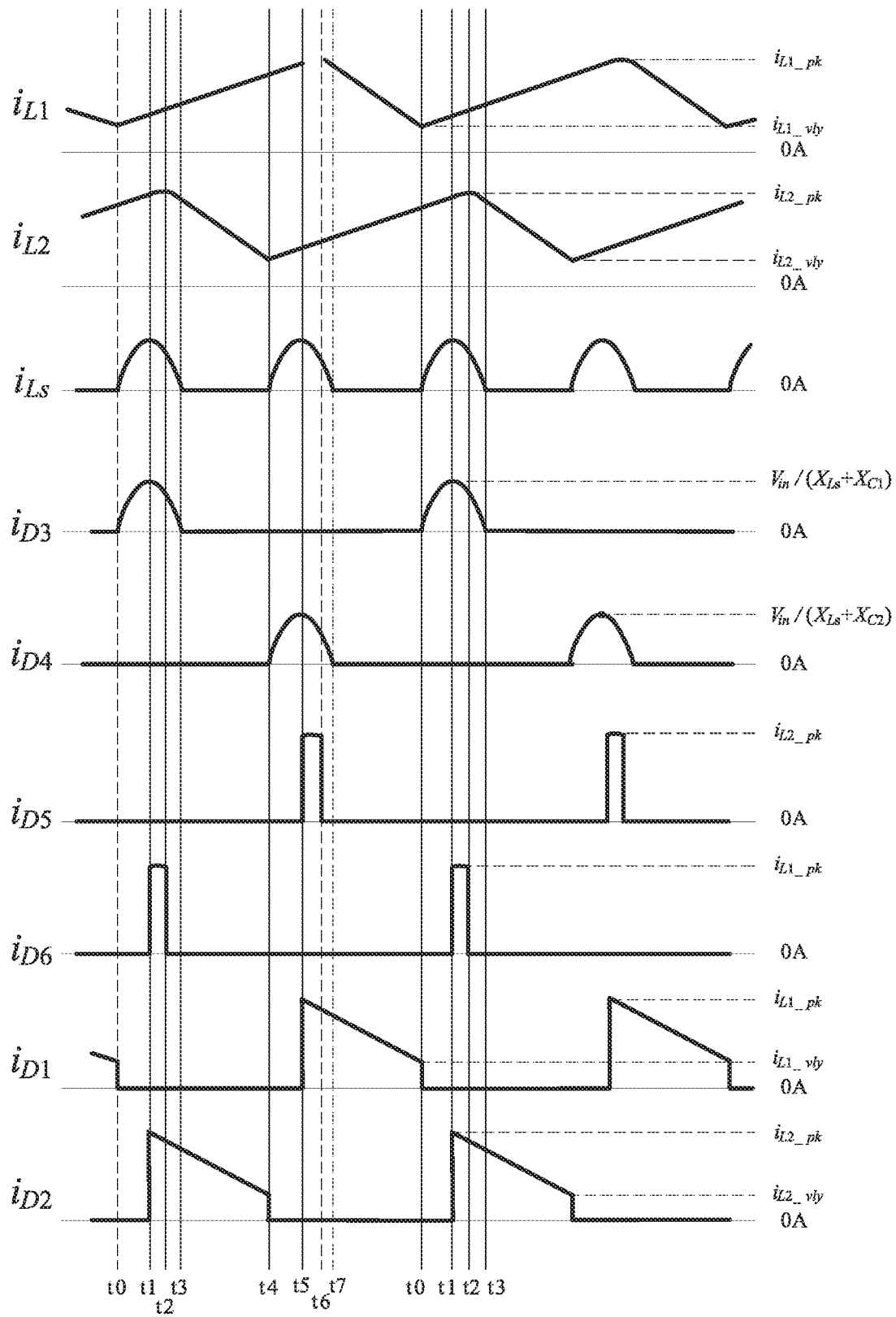
FIG. 5b shows the other part of waveform diagrams of the multi-phase boost converting apparatus in the full-type first working state to the full-type eighth working state of the present disclosure.

FIG. 5a shows a part of waveform diagrams of the multi-phase boost converting apparatus in the full-type first working state to the full-type eighth working state of the present disclosure. FIG. 5b shows the other part of waveform diagrams of the multi-phase boost converting apparatus in the full-type first working state to the full-type eighth working state of the present disclosure. The full-type first working state is between a zero timing point t0 and a first timing point t1, the full-type second working state is between the first timing point t1 and a second timing point t2, the full-type third working state is between the second timing point t2 and a third timing point t3, the full-type fourth working state is between the third timing point t3 and a fourth timing point t4, the full-type fifth working state is between the fourth timing point t4 and a fifth timing point t5, the full-type sixth working state is between the fifth timing point t5 and a sixth timing point t6, the full-type seventh working state is between the sixth timing point t6 and a seventh timing point t7, and the full-type eighth working state is between the seventh timing point t7 and the zero timing point t0.

The advantage of the present disclosure is to use a snubber with a simple structure to reduce the switching loss of the multi-phase boost converter and to reduce the electromagnetic interference. The present disclosure can absorb spikes and slow down the rising slope of the switch cross voltage after the switch of the multi-phase boost converter is turned off, so as to reduce the electromagnetic interference emission intensity caused by the high voltage slope, so as to reduce the switching loss when the switch is turned off (namely, the overlap area of the switch voltage and the switch current on the voltage and current waveforms).

The passive lossless snubber 104 of the present disclosure only includes four diodes, one inductor and two capacitors to achieve the advantage of the present disclosure mentioned above, and the first resonant capacitor $C_1$, the second resonant capacitor $C_2$, the input-end first unidirectional conduction component $D_3$, the input-end second unidirectional conduction component $D_4$, the output-end first unidirectional conduction component $D_5$, the output-end second unidirectional conduction component $D_6$ and the resonant inductor $L_s$ included in the passive lossless snubber 104 do not participate in the processing of the main power, nor are they in the power transmission path, so that the passive lossless snubber 104 only needs a very low component power rating; therefore, the present disclosure can reduce the component volume and the additional cost. According to the experimental data, under the same peripheral component parameters and full load efficiency, compared with the traditional RCD snubber, the present disclosure can reduce the switching loss and the electromagnetic interference greatly.

What is claimed is:

1. A multi-phase boost converting apparatus comprising:
a multi-phase boost converter; and
a passive lossless snubber electrically connected to the multi-phase boost converter,
wherein the passive lossless snubber comprises:
  a first resonant capacitor electrically connected to the multi-phase boost converter;
  a second resonant capacitor electrically connected to the multi-phase boost converter;
  an output-end first unidirectional conduction component electrically connected to the multi-phase boost converter and the first resonant capacitor;
  an output-end second unidirectional conduction component electrically connected to the multi-phase boost converter and the second resonant capacitor;
  an input-end first unidirectional conduction component electrically connected to the first resonant capacitor and the output-end first unidirectional conduction component;
  an input-end second unidirectional conduction component electrically connected to the second resonant capacitor and the output-end second unidirectional conduction component; and
  a resonant inductor electrically connected to the multi-phase boost converter, the input-end first unidirectional conduction component and the input-end second unidirectional conduction component,
wherein the multi-phase boost converter comprises:
  a first transistor switch electrically connected to the first resonant capacitor and comprising a first parasitic capacitor;
  a second transistor switch electrically connected to the second resonant capacitor and comprising a second parasitic capacitor;
  a switch controller electrically connected to the first transistor switch and the second transistor switch;
  a first inductor electrically connected to the first transistor switch;

a second inductor electrically connected to the second transistor switch;
a first diode electrically connected to the first transistor switch;
a second diode electrically connected to the second transistor switch;
an output end electrically connected to the first diode and the second diode; and
an input end electrically connected to the first inductor and the second inductor,
wherein the switch controller is configured to transmit a pulse width modulation signal to the first transistor switch to drive the first transistor switch or the switch controller is configured to transmit the pulse width modulation signal to the second transistor switch to drive the second transistor switch; a duty cycle of the pulse width modulation signal is greater than 50%; the multi-phase boost converting apparatus is configured to sequentially operate in a full-type first working state, a full-type second working state, a full-type third working state, a full-type fourth working state, a full-type fifth working state, a full-type sixth working state, a full-type seventh working state and a full-type eighth working state;
wherein in the full-type first working state, the switch controller is configured to turn on the first transistor switch and turn on the second transistor switch, and the first inductor is configured to be excited by an input-end voltage of the input end to store a first electric energy in a first magnetic field form, and the second inductor is configured to be excited by the input-end voltage to store a second electric energy in a second magnetic field form, and a first inductor current flowing through the first inductor increases, and a second inductor current flowing through the second inductor increases, and the resonant inductor and the first resonant capacitor are configured to be charged by the input-end voltage and to resonate.

2. The multi-phase boost converting apparatus of claim 1, wherein
in the full-type second working state, the switch controller is configured to turn on the first transistor switch and turn off the second transistor switch.

3. The multi-phase boost converting apparatus of claim 2, wherein in the full-type third working state, the switch controller is configured to turn off the second transistor switch and turn on the first transistor switch;
wherein in the full-type fourth working state, the switch controller is configured to turn off the second transistor switch and turn on the first transistor switch.

4. The multi-phase boost converting apparatus of claim 3, wherein in the full-type fifth working state, the switch controller is configured to turn on the second transistor switch and turn on the first transistor switch;
wherein in the full-type sixth working state, the switch controller is configured to turn on the second transistor switch and turn off the first transistor switch.

5. The multi-phase boost converting apparatus of claim 4, wherein in the full-type seventh working state, the switch controller is configured to turn on the second transistor switch and turn off the first transistor switch;
wherein in the full-type eighth working state, the switch controller is configured to turn on the second transistor switch and turn off the first transistor switch.

* * * * *